(12) United States Patent
Farmer et al.

(10) Patent No.: US 7,583,897 B2
(45) Date of Patent: Sep. 1, 2009

(54) OPTICAL NETWORK SYSTEM AND METHOD FOR SUPPORTING UPSTREAM SIGNALS PROPAGATED ACCORDING TO A CABLE MODEM PROTOCOL

(75) Inventors: James O. Farmer, Cumming, GA (US); Stephen A. Thomas, Marietta, GA (US); Patrick Quinn, Lafayette, CA (US)

(73) Assignee: Enablence USA FTTx Networks Inc., Alpharetta, GA (US)

( * ) Notice: Subject to any disclaimer, the term of this patent is extended or adjusted under 35 U.S.C. 154(b) by 26 days.

(21) Appl. No.: 11/390,428

(22) Filed: Mar. 27, 2006

(65) Prior Publication Data

US 2006/0269285 A1    Nov. 30, 2006

Related U.S. Application Data

(63) Continuation-in-part of application No. 10/041,299, filed on Jan. 8, 2002, now Pat. No. 7,184,664.

(60) Provisional application No. 60/665,133, filed on Mar. 26, 2005.

(51) Int. Cl.
*H04B 10/00* (2006.01)
(52) U.S. Cl. .............................. 398/72; 398/71; 398/70
(58) Field of Classification Search .............. 398/66–73
See application file for complete search history.

(56) References Cited

U.S. PATENT DOCUMENTS 4,253,035 A    2/1981    Amitay
4,295,005 A    10/1981   Daugherty et al.
4,495,545 A    1/1985    Dufresne et al.
4,500,990 A    2/1985    Akashi (Continued)

FOREIGN PATENT DOCUMENTS

CA        2107922        4/1995

(Continued)

OTHER PUBLICATIONS

Tian et al., "Raman Crosstalk in Fiber-Optic Hybrid CATV Systems with Wide Channel Separations," IEEE Phtonics Tech Letters, Jan. 2004, pp. 344-346, vol. 16.

(Continued)

*Primary Examiner*—Agustin Bello
(74) *Attorney, Agent, or Firm*—Steven P. Wigmore; Sentry Law Group

(57) ABSTRACT

A modification to a cable modem termination system (CMTS) can include instructing the CMTS to ignore or skip steps of its timing algorithm so that upstream cable modem signals are controlled only by the upstream protocol of the optical network system. According to another exemplary aspect, a time stamp can be added to the upstream cable modem signals so that the CTMS timing scheme can be used. This time stamp can be used in the data service hub to adjust for the delays that occur while the upstream cable modem signals are sent across the optical network. Another adjustment of the CMTS timing scheme can include using less than a total number of miniature time slots for upstream cable modem transmissions. According to another exemplary aspect, a cable modem termination system can be positioned within a laser transceiver node or a subscriber optical interface.

15 Claims, 18 Drawing Sheets

U.S. PATENT DOCUMENTS

| | | |
|---|---|---|
| 4,654,891 A | 3/1987 | Smith |
| 4,655,517 A | 4/1987 | Bryce |
| 4,665,517 A | 5/1987 | Widmer |
| 4,733,398 A | 3/1988 | Shibagaki et al. |
| 4,763,317 A | 8/1988 | Lehman et al. |
| 4,805,979 A | 2/1989 | Bossard et al. |
| 4,852,023 A | 7/1989 | Lee et al. |
| 4,945,541 A | 7/1990 | Nakayama |
| 4,956,863 A | 9/1990 | Goss |
| 4,975,899 A | 12/1990 | Faulkner |
| 5,105,336 A | 4/1992 | Jacoby et al. |
| 5,132,992 A | 7/1992 | Yurt et al. |
| 5,144,267 A | 9/1992 | West, Jr. |
| 5,179,591 A | 1/1993 | Hardy |
| 5,189,725 A | 2/1993 | Bensel, III et al. |
| 5,247,347 A | 9/1993 | Litteral et al. |
| 5,249,194 A | 9/1993 | Sakanushi |
| 5,253,250 A | 10/1993 | Schlafer et al. |
| 5,253,275 A | 10/1993 | Yurt et al. |
| 5,303,295 A | 4/1994 | West et al. |
| 5,313,546 A | 5/1994 | Toffetti |
| 5,325,223 A | 6/1994 | Bears |
| 5,345,504 A | 9/1994 | West, Jr. |
| 5,349,457 A | 9/1994 | Bears |
| 5,365,585 A | 11/1994 | Puhl et al. |
| 5,365,588 A | 11/1994 | Bianco et al. |
| 5,378,174 A | 1/1995 | Brownlie et al. |
| 5,402,315 A | 3/1995 | Reichle |
| 5,412,498 A | 5/1995 | Arstein et al. |
| 5,432,875 A | 7/1995 | Korkowski et al. |
| 5,469,507 A | 11/1995 | Canetti et al. |
| 5,495,549 A | 2/1996 | Schneider et al. |
| 5,509,099 A | 4/1996 | Hermsen et al. |
| 5,510,921 A | 4/1996 | Takai et al. |
| 5,528,455 A | 6/1996 | Miles |
| 5,528,582 A | 6/1996 | Bodeep |
| 5,534,912 A | 7/1996 | Kostreski |
| 5,541,917 A | 7/1996 | Farris |
| 5,550,863 A | 8/1996 | Yurt et al. |
| 5,557,317 A | 9/1996 | Nishio et al. |
| 5,559,858 A | 9/1996 | Beveridge |
| 5,566,099 A | 10/1996 | Shimada |
| 5,572,347 A | 11/1996 | Burton et al. |
| 5,572,348 A | 11/1996 | Carlson |
| 5,572,349 A | 11/1996 | Hale |
| 5,666,487 A | 9/1997 | Goodman et al. |
| 5,694,232 A | 12/1997 | Parsay et al. |
| 5,701,186 A | 12/1997 | Huber |
| 5,706,303 A | 1/1998 | Lawrence |
| 5,715,020 A | 2/1998 | Kuroiwa et al. |
| 5,731,546 A | 3/1998 | Miles et al. |
| RE35,774 E | 4/1998 | Moura et al. |
| 5,769,159 A | 6/1998 | Yun |
| 5,778,017 A | 7/1998 | Sato et al. |
| 5,790,523 A | 8/1998 | Ritchie, Jr. |
| 5,793,413 A | 8/1998 | Hylton |
| 5,793,506 A | 8/1998 | Schmid |
| 5,799,088 A | 8/1998 | Raike |
| 5,802,089 A | 9/1998 | Link |
| 5,822,102 A | 10/1998 | Bodeep et al. |
| 5,861,966 A | 1/1999 | Ortel |
| 5,867,485 A | 2/1999 | Chambers et al. |
| 5,875,430 A | 2/1999 | Koether |
| 5,880,864 A | 3/1999 | Williams |
| 5,892,865 A | 4/1999 | Williams |
| 5,953,690 A | 9/1999 | Lemon |
| 5,969,836 A | 10/1999 | Foltzer |
| 5,974,063 A | 10/1999 | Yoshida |
| 6,002,692 A | 12/1999 | Wills |
| 6,002,720 A | 12/1999 | Yurt et al. |
| 6,041,056 A | 3/2000 | Bigham et al. |
| 6,097,159 A | 8/2000 | Mogi |
| 6,097,515 A | 8/2000 | Pomp et al. |
| 6,144,702 A | 11/2000 | Yurt et al. |
| 6,151,343 A | 11/2000 | Jurgensen |
| 6,167,553 A | 12/2000 | Dent |
| RE37,125 E | 4/2001 | Carlson |
| 6,215,939 B1 | 4/2001 | Cloud |
| 6,229,701 B1 | 5/2001 | Kung et al. |
| 6,295,148 B1 | 9/2001 | Atlas |
| 6,300,562 B1 | 10/2001 | Daoud |
| 6,330,155 B1 | 12/2001 | Remsburg |
| 6,336,201 B1 | 1/2002 | Geile et al. |
| 6,342,004 B1 | 1/2002 | Lattimore et al. |
| 6,356,369 B1 | 3/2002 | Farhan |
| 6,360,320 B1 | 3/2002 | Ishiguro et al. |
| 6,385,366 B1 | 5/2002 | Lin |
| 6,421,150 B2 | 7/2002 | Graves |
| 6,424,656 B1 | 7/2002 | Hoebeke |
| 6,427,035 B1 | 7/2002 | Mahony |
| 6,452,714 B1 | 9/2002 | Rollins |
| 6,460,182 B1 | 10/2002 | Buabbud |
| 6,463,068 B1 | 10/2002 | Lin et al. |
| 6,483,635 B1 | 11/2002 | Wach |
| 6,486,907 B1 | 11/2002 | Farber et al. |
| 6,490,727 B1 | 12/2002 | Nazarathy et al. |
| 6,493,335 B1 | 12/2002 | Darcie et al. |
| 6,496,641 B1 | 12/2002 | Mahony |
| 6,507,494 B1 | 1/2003 | Hutchison |
| 6,529,301 B1 | 3/2003 | Wang |
| 6,546,014 B1 | 4/2003 | Kramer et al. |
| 6,577,414 B1 | 6/2003 | Feldman et al. |
| 6,611,522 B1 | 8/2003 | Zheng et al. |
| 6,621,975 B2 | 9/2003 | Laporte et al. |
| 6,654,565 B2 | 11/2003 | Kenny |
| 6,674,967 B2 | 1/2004 | Skrobko et al. |
| 6,680,948 B1 | 1/2004 | Majd et al. |
| 6,682,010 B2 | 1/2004 | Pohl |
| 6,687,376 B1 | 2/2004 | Yamaguchi |
| 6,687,432 B2 | 2/2004 | Schemmann et al. |
| 6,707,024 B2 | 3/2004 | Miyamoto |
| 6,738,983 B1 | 5/2004 | Rao et al. |
| 6,740,861 B2 | 5/2004 | Matsuda |
| 6,771,614 B1 | 8/2004 | Jones, IV et al. |
| 6,775,137 B2 | 8/2004 | Chu et al. |
| 6,778,785 B2 | 8/2004 | Imajo |
| 6,804,256 B2 | 10/2004 | Chang |
| 6,804,354 B1 | 10/2004 | Driscoll |
| 6,807,188 B1 | 10/2004 | Blahut et al. |
| 6,814,328 B1 | 11/2004 | Li et al. |
| 6,823,385 B2 | 11/2004 | McKinnon, III et al. |
| 6,889,007 B1 | 5/2005 | Wang et al. |
| 6,912,075 B1 | 6/2005 | Ionov et al. |
| 6,961,956 B2 | 11/2005 | Bontempi |
| 6,973,271 B2 | 12/2005 | Farmer et al. |
| 6,999,414 B2 * | 2/2006 | Gummalla et al. ......... 370/230 |
| 7,007,297 B1 | 2/2006 | Woodward |
| 7,023,871 B2 | 4/2006 | Lind et al. |
| 7,145,887 B1 * | 12/2006 | Akgun et al. ............. 370/321 |
| 7,190,901 B2 | 3/2007 | Farmer et al. |
| 7,218,855 B2 | 5/2007 | Whittlesey et al. |
| 7,222,358 B2 | 5/2007 | Levinson et al. |
| 7,227,871 B2 * | 6/2007 | Dworkin et al. ............ 370/442 |
| 7,242,694 B2 * | 7/2007 | Beser ...................... 370/449 |
| 7,298,762 B2 * | 11/2007 | Rakib ...................... 370/468 |
| 7,376,718 B2 * | 5/2008 | Gould et al. ............... 709/220 |
| 2001/0002195 A1 | 5/2001 | Fellman |
| 2001/0002196 A1 | 5/2001 | Fellman |
| 2001/0002486 A1 | 5/2001 | Kocher et al. |
| 2001/0004362 A1 | 6/2001 | Kamiya |
| 2001/0030785 A1 | 10/2001 | Pangrac |
| 2002/0006197 A1 | 1/2002 | Carroll et al. |
| 2002/0012138 A1 | 1/2002 | Graves |
| 2002/0021465 A1 | 2/2002 | Moore, Jr. |

| | | | |
|---|---|---|---|
| 2002/0027928 A1 | 3/2002 | Fang | |
| 2002/0039218 A1 | 4/2002 | Farmer | |
| 2002/0063924 A1 | 5/2002 | Kimbrough et al. | |
| 2002/0089725 A1 | 7/2002 | Farmer | |
| 2002/0105965 A1 | 8/2002 | Dravida et al. | |
| 2002/0106178 A1 | 8/2002 | Bumgarner et al. | |
| 2002/0116719 A1 | 8/2002 | Dapper et al. | |
| 2002/0135843 A1 | 9/2002 | Gruia | |
| 2002/0141159 A1 | 10/2002 | Bloemen | |
| 2002/0164026 A1 | 11/2002 | Huima | |
| 2002/0181925 A1 | 12/2002 | Hodge et al. | |
| 2003/0007210 A1 | 1/2003 | Kenny | |
| 2003/0007220 A1 | 1/2003 | Whittlesey et al. | |
| 2003/0011849 A1 | 1/2003 | Farmer et al. | |
| 2003/0016692 A1 | 1/2003 | Thomas et al. | |
| 2003/0072059 A1 | 4/2003 | Thomas et al. | |
| 2003/0086140 A1 | 5/2003 | Thomas et al. | |
| 2003/0090320 A1 | 5/2003 | Skrobko et al. | |
| 2003/0128983 A1 | 7/2003 | BuAbbud et al. | |
| 2003/0154282 A1 | 8/2003 | Horvitz | |
| 2003/0189587 A1 | 10/2003 | White et al. | |
| 2003/0194241 A1 | 10/2003 | Farmer | |
| 2003/0206564 A1 | 11/2003 | Mills et al. | |
| 2003/0206634 A1 | 11/2003 | Rose | |
| 2003/0223750 A1 | 12/2003 | Farmer et al. | |
| 2004/0086277 A1 | 5/2004 | Kenny | |
| 2004/0131357 A1 | 7/2004 | Farmer et al. | |
| 2004/0141747 A1 | 7/2004 | Kenny et al. | |
| 2004/0161217 A1 | 8/2004 | Hodge et al. | |
| 2004/0199502 A1 | 10/2004 | Wong et al. | |
| 2004/0221088 A1 | 11/2004 | Lisitsa et al. | |
| 2004/0253003 A1 | 12/2004 | Farmer et al. | |
| 2004/0264492 A1 | 12/2004 | Blahut | |
| 2004/0267730 A1 | 12/2004 | Dumais et al. | |
| 2005/0053350 A1 | 3/2005 | Hodge et al. | |
| 2005/0074241 A1 | 4/2005 | Farmer et al. | |
| 2005/0081244 A1 | 4/2005 | Barrett et al. | |
| 2005/0123001 A1 | 6/2005 | Craven et al. | |
| 2005/0125837 A1 | 6/2005 | Farmer et al. | |
| 2005/0175035 A1 | 8/2005 | Neely et al. | |
| 2006/0020975 A1 | 1/2006 | Kenny et al. | |
| 2006/0039699 A1 | 2/2006 | Farmer et al. | |
| 2006/0075428 A1 | 4/2006 | Farmer et al. | |
| 2007/0076717 A1* | 4/2007 | Limb et al. | 370/390 |

FOREIGN PATENT DOCUMENTS

| | | |
|---|---|---|
| EP | 0566662 A2 | 7/1992 |
| EP | 0713347 A2 | 5/1996 |
| EP | 0720322 A2 | 7/1996 |
| EP | 0955739 A2 | 11/1999 |
| EP | 0933892 B1 | 10/2003 |
| JP | 7-20327 | 1/1995 |
| JP | 10-20123 | 1/1998 |
| JP | 11-305052 | 11/1999 |
| JP | 4-504433 | 3/2002 |
| MX | 180038 | 11/1995 |
| TW | 72821 | 8/1995 |
| WO | WO 01/27940 A2 | 4/2001 |
| WO | WO 02/30019 A3 | 4/2002 |
| WO | WO 02/30020 A2 | 4/2002 |
| WO | WO 02/060123 A2 | 8/2002 |
| WO | WO 03/001737 A3 | 1/2003 |
| WO | WO 03/005611 A2 | 1/2003 |
| WO | WO 03/005612 A1 | 1/2003 |
| WO | WO 03/019243 A2 | 3/2003 |
| WO | WO 03/021820 A1 | 3/2003 |
| WO | WO 03/023980 A2 | 3/2003 |
| WO | WO 03/079567 A1 | 9/2003 |
| WO | WO 03/090396 A2 | 10/2003 |
| WO | WO 2006/014433 A2 | 2/2006 |
| WO | WO 2006/020538 A2 | 2/2006 |
| WO | WO 2006/041784 A2 | 4/2006 |

OTHER PUBLICATIONS

International Search Report dated Oct. 25, 2006 for PCT/US05/35512.
International Search Report dated Nov. 8, 2006 for PCT/US05/28020.
International Search Report dated Feb. 6, 2007 for PCT/US05/46419.
International Search Report dated Feb. 21, 2007 for PCT/US06/11159.
"Trading Update and Operational Review Presentation" Marconi, Sep. 4, 2001, pp. 1-35.
"Cable Market" 2 pgs, Marconi Corporation, PLC, 2000 at www.Marconi.com.
"Communications" 2 pgs, Marconi Corporation, PLC, 2000 at www.Marconi.com.
"Dalton Utilities" 9 pgs, Marconi Corporation, PLC, 2002 at www.Marconi.com.
"Deep Fiber Solutions" 3 pgs, Marconi Corporation, PLC, 2000 at www.Marconi.com.
"Deep Fiber HFC Features and Benefits" 1 pg, Marconi Corporation, PLC, 2002 at www.Marconi.com.
"Deep Fiber HFC Network Diagram" 1 pg, Marconi Corporation, PLC, 2002 at www.Marconi.com.
"Deep Fiber Product Overview: New FITL Configuration" 2 pgs, Marconi Corporation, PLC, 2002 at www.Marconi.com.
"Deep Fiber Technical Specifications" 2 pgs, Marconi Corporation, PLC, 2002 at www.Marconi.com.
"Deep Fiber HFC—New FITL Configuration" 1 pg, Marconi Corporation, PLC, 2002 at www.Marconi.com.
"En-Touch" at 5 pgs, Marconi Corporation, PLC, 2002 www.Marconi.com.
"Fiber to the Home" International Engineering Consortium (no date) pp. 1-10, available wt www.iec.com.
"Deep Fiber HFC" Marconi Corporation PLC 2000, pp. 1-2.
"Integrated Voice, Video and Data Services Over a Single Fiber: A Compelling Opportunity for Cable Operators" Marconi Corporation PLC, May 2000, 6 pgs.
"Deep Fiber Solutions: Advanced Broadband Services" Marconi Corporation PLC, May 2000, 5pgs.
"Deep Fiber HFC: A Next-Generation Integrated Access Solution Offering Significant Improvement Over Traditional HFC Architectures" Marconi Corporation PLC, May 2000, 8pgs.
"A Gold Mine of Opportunities in the Face of Increasing Competition: Choices for Utilities Entering the Communications Marketplace" Marconi Corporation PLC, May 2000, 6pgs.
"Fiber Optics on New Development MDUs: A Research Summary," Marconi Corporation PLC, May 2000 5pgs.
"Thermal Management Challenges: Small ONU Enclosures," Marconi Corporation PLC, May 2000, 9pgs.
"Passive Optical Networks—Is There Light at the End of the Access Tunnel?" CIBC World Markets Inc., Jan. 11, 2001, pp. 1-66.
"36.24 8B/10B transmission code", IEEE 2000, pp. 966-969.
G. Khoe et al., "Coherent Multicarrier Technology for Implementaion in the Customer Access," IEEE, May/Jun. 1993, pp. 695-713.
L. Linnell, "A Wide-Band Local Access System Using Emerging-Technology Components," IEEE, Jul. 1986, pp. 612-618.
"Digital Broadband Delivery System: Out of Band Transport—Mode B," Society of Cable Telecommunications Engineers, Inc., Aug. 10, 1998, 76 pgs.
"Digital Broadband Delivery System: Out of Band Transport—Mode A," Society of Cable Telecommunications Engineers, Inc., Aug. 26, 1998, 49 pgs.
B. Gaglianello & P. Thompson, "An Efficient MAC Layer Protocol for EPON," IEEE 802.3 EFM Nov. 2001, 9 pgs.
"Policing and Shaping Overview" *Quality of Service Solutions Configuration Guide*, Cisco Systems, Inc. (No Date).
Cisco IOS™ Software Quality of Service Solutions, Cisco Systems, Inc. 1998, 28 pgs.
International Search Report for PCT/US01/21298, 2 pgs, mailed Jun. 17, 2002.

International Search Report for PCT/US02/03056, 1 pg, mailed Jun. 12, 2002.
"Ethernet—Accelerating the Standard for Speed," 7 pgs, Gigabit Ethernet Alliance, Nov. 2000 www.gigabit-ethernet.org.
"eLuminant—Asynchronous Transfer Mode (ATM) Passive Optical Networks (PONS) Tutorial" 28 pgs, International Engineering Consortium, 2000 at www.iec.org.
International Search Report dated Dec. 4, 2002 for PCT/US02/27398.
International Search Report dated Dec. 17, 2002 for PCT/US02/15861.
Global Access™, Universal Services Gateway, USG100, ARRIS, pp. 1-2, Oct. 18, 2002.
Global Access™, Universal Access Switch, UA4024, ARRIS, pp. 1-2, Aug. 28, 2002.
Partial International Search Report dated Jan. 3, 2003 for PCT/US01/31032.
International Search Report dated Apr. 22, 2003 for PCT/US01/50361.
L. Zhang et al., "Label-switching architecture for IP traffic over WDM networks", IEE Proc.-Commun., vol. 147, No. 5, Oct. 2000, pp. 269-275.
J. Masip-Torné, et al., "Providing Differentiated Service Categories in Optical Packet Networks", Proceedings of the International Teletraffic Congress, 1999. ITC-16. Teletraffic Engineering in a Competitive World. Edinburgh, UK, Jun. 7-11, 1999, Teletraffic Science and Engineering, Amsterdam: Elsevier, NL, vol. 3B, Jun. 7, 1999, pp. 1115-1126.
J. Bannister et al., "How Many Wavelengths Do We Really Need? A Study of the Performance Limits of Packet Over Wavelengths", Optical Networks Magazin, SPIE, Bellingham, WA, vol. 1, No. 2, Apr. 2000, pp. 17-28.
O. W. W. Yang, et al., "All-Optical WDM/TDM Star-Bus Network Using Optical Amplifiers", Journal of Optical Communications, Fachverlage Schiele & Schon, Berlin, DE, vol. 16, No. 6, Dec. 1, 1995, pp. 216-226.
Walter Ciciora et al., "Modern Cable Television Technology: Video, Voice, and Data Communications", © 1999 by Morgan Kaufman Publishers, Inc., pp. 167-176.
International Search Report dated Apr. 21, 2003 for PCT/US02/28734.
Written Opinion dated May 6, 2003 for PCT/US01/21298.
International Search Report dated Jul. 2, 2003 for PCT/US03/07814.
Angelopoulos J.D. et al, "A Transparent Mac Method for Bandwidth Sharing and CDV Control at the ATM layer of Passive Optical Networks", Journal of Lightwave Technology, IEEE. New York, US, vol. 14, No. 12, Dec. 1, 1996, pp. 2625-2634, XP000642251, ISSN: 0733-8724.
Optical Networks Daily, A Publication of Optical Keyhole, Aug. 26, 2003, pp. 1-13.
International Search Report dated Jul. 7, 2003 for PCT/US01/51350.
International Search Report dated Oct. 3, 2003 for PCT/US03/12231.
G. Scott Glasesemann et al., "The Mechanical Reliability of Corning® Optical Fiber in Bending White Paper," Sep. 2002, pp. 1-4.
Corning® SMF-28™ Optical Fiber Product Information, Corning® Single-Mode Optical Fiber, Apr. 2002, pp. 1-4.
Bourne, John "Heathrow—Experience and Evolution" IEEE. 1990, pp. 1091-1095.
Miki, Tetsuya. "A Design Concept on Fiber-Optic Wavelength-Division-Multiplexing Subscriber Loop System" WTG—Fachber. 1980, pp. 41-45.
Yamaguchi, K. "A Broadband Access Network Based on Optical Signal Processing: The Photonic Highway" IEEE. 1990, pp. 1030-1037.
Ciciora, Walter S. et al., "Modern Cable Television Technology: Video, Voice, and Data Communications", © 1999, pp. 162-214, Chapter 4, Morgan Kaufmann Publishers, Inc., San Francisco, California.
Companie Deutsch, Components for Fiber Optics, "Triplexers—WDM: FSAN—TPM Series", pp. 1-6.
CEDaily Direct News, "Today's Report", Mar. 19, 2001, pp. 1-5.
Lucent Technologies, "Lucent Technologies Introduces Single-Fiber Network Access Devices for Voice, Video, and Data Services to the Home or Curb", Jun. 6, 2000, pp. 1-2.
Lucent Technologies, "Agere Systems Introduces Single-Fiber Network Access Devices for Voice, Video and Data Services to the Home or Curb", Mar. 19, 2001, pp. 1-3.
Written Opinion dated Feb. 11, 2004 for PCT/US01/50361.
McDevitt, F.R., Switched vs. Broadcast Video for Fiber-to-the-Home Systems, Communications 1990. ICC 90, Including Supercom Technical Sessions. Supercomm/ICC '90. Conference Record, IEEE International Conference on, Apr. 16-19, 1990.
Mangum, K.: Ko, D. Subscriber Loops and Services, 1988. Proceedings, ISSLS 88., International Symposium on, Sep. 11-16, 1988 pp. 208-212.
Han et al., Burst-Mode Penalty of AC- Coupled Optical Receivers Optimized for 8B/10B Line Code, 2004, IEEE.
Coppinger et al., Nonlinear Raman Cross-Talk in a Video Overlay Passive Optical Network, 2003, Tuesday Afternoon, OFC 2003, vol. 1, pp. 285-286.
Piehler et al., Nonlinear Raman Crosstalk in a 125-Mb/s CWDM Overlay on a 1310-nm Video Access Network, 2003, Optical Society of America.
Wong et al., 50-dB Nonlinear Crosstalk Suppression in a WDM Analog Fiber System by Complementary Modulation and Balanced Detection, 2003, IEEE, pp. 500-505.
Perkins, The Art of Overlaying Video Services on a BPON, 2004, Bechtel Corporation, pp. 1-9.
Effenberger et al., "G.983.VideoReturnPath," Oct. 2004, International Telecommunications Union, Telecommunication Standardization Sector, Study Group 15—Contribution 13, pp. 1-18.
Fludger et al., "Pump to Signal RIN Transfer in Raman Fiber Amplifiers", Journal of Lightwave Technology, IEEE. New York, US, vol. 19, No. 8, Dec. Aug. 2001, pp. 1140-1148, ISSN: 0733-8724.
"Spectral Grids for WDM Applications: CWDM Wavelength Grid", International Telecommunications Union, ITU-T, Rec. G.694.2, Dec. 2003, pp. i-iii and pp. 1-4.
International Preliminary Examination Report of Nov. 19, 2003 for PCT/US03/07814.
International Preliminary Report on Patentability of Apr. 1, 2005 for PCT/US01/51350.
International Preliminary Examination Report of Sep. 17, 2004 for PCT/US03/12231.
International Search Report of Apr. 18, 2006 for PCT/US05/23847.
PCT International Search Report—PCT/US05/28020, pp. 1, Nov. 8, 2006.
PCT International Search Report—PCT/US05/46419, pp. 1, Feb. 14, 2007.
PCT International Search Report—PCT/US006/11159, pp. 1, Feb. 21, 2007.
PCT International Search Report—PCT/US05/35512, pp. 1, Oct. 25, 2006.
PCT Written Opinion—PCT/US01/21298, pp. 1, May 6, 2003.
Tian et al., Raman Crosstalk in Fiber-Optic Hybrid CATV Systems with Wide Channel Separations, *IEEE Photonics Technology Letters*, vol. 16 (1), pp. 344-346, Jan. 1, 2004.

* cited by examiner

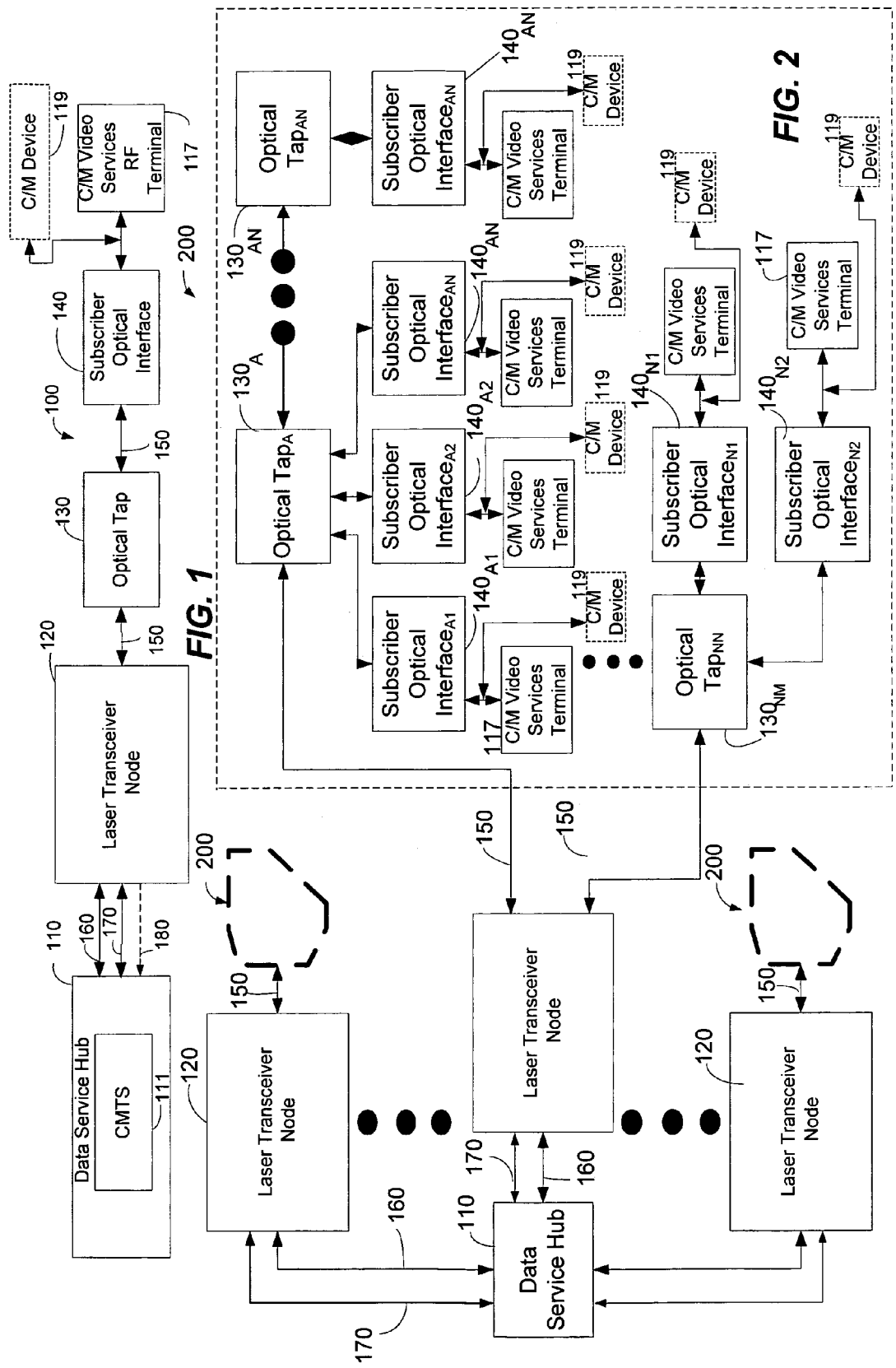

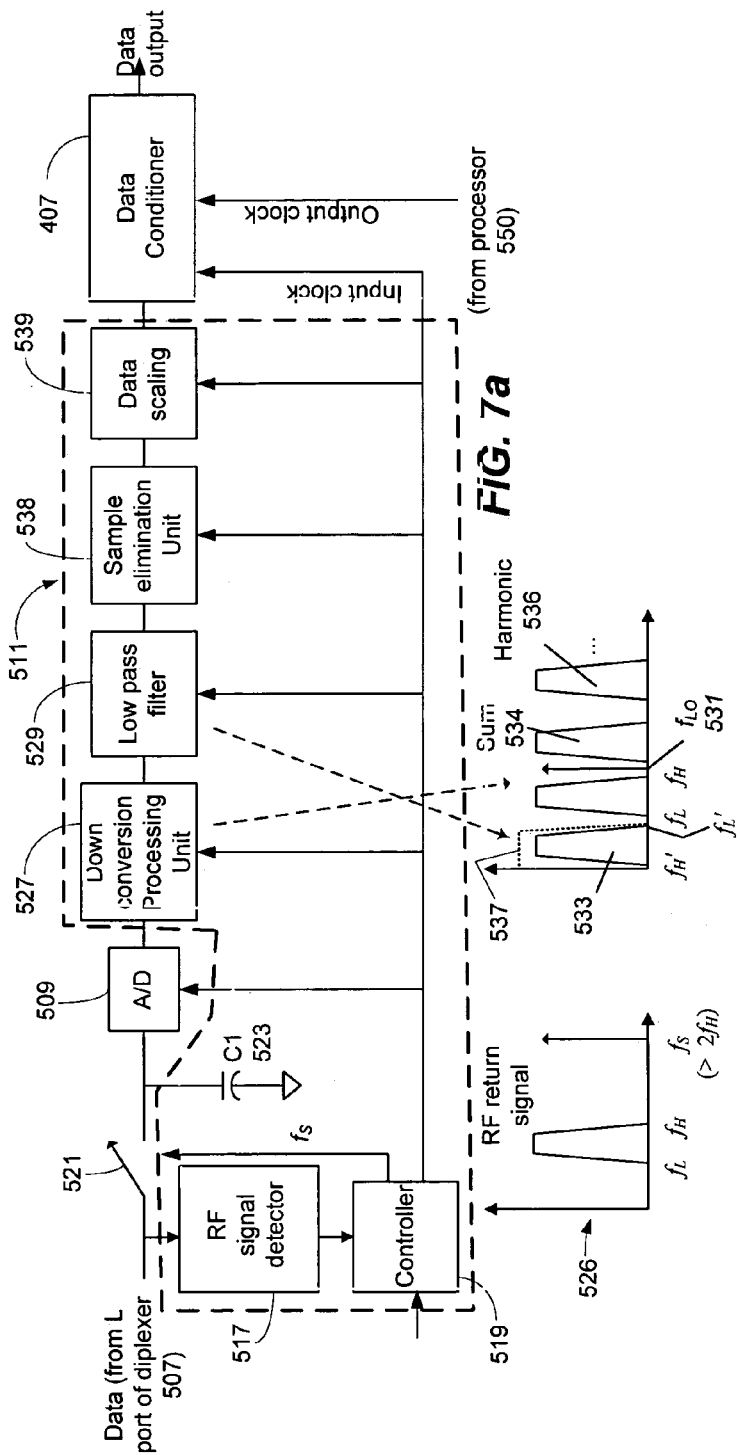
FIG. 7a
FIG. 7b
FIG. 7c
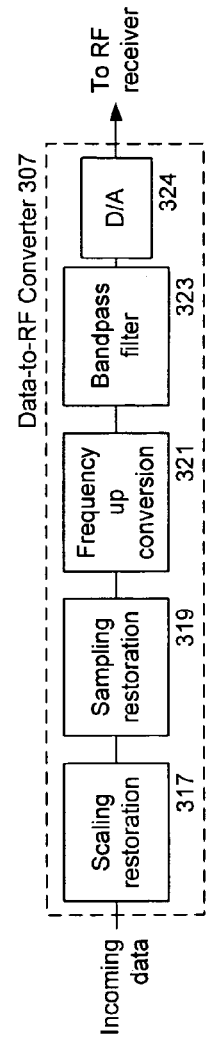
FIG. 8

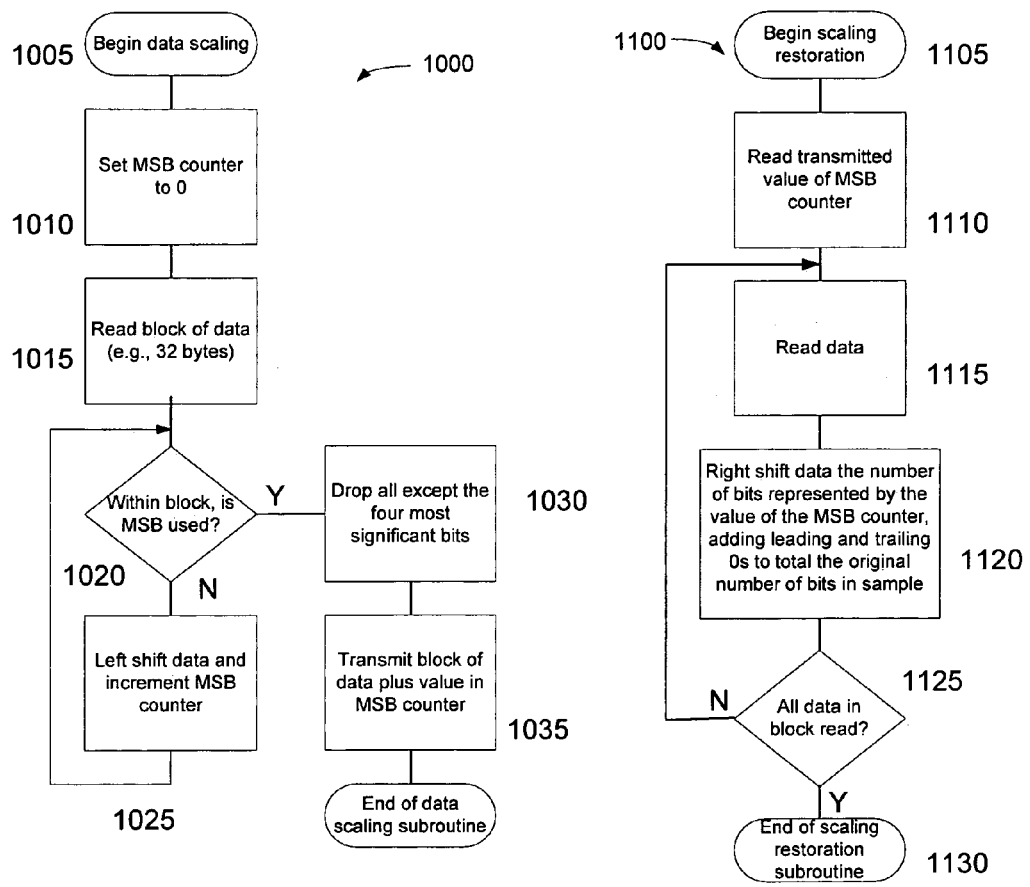
FIG. 9
FIG. 10
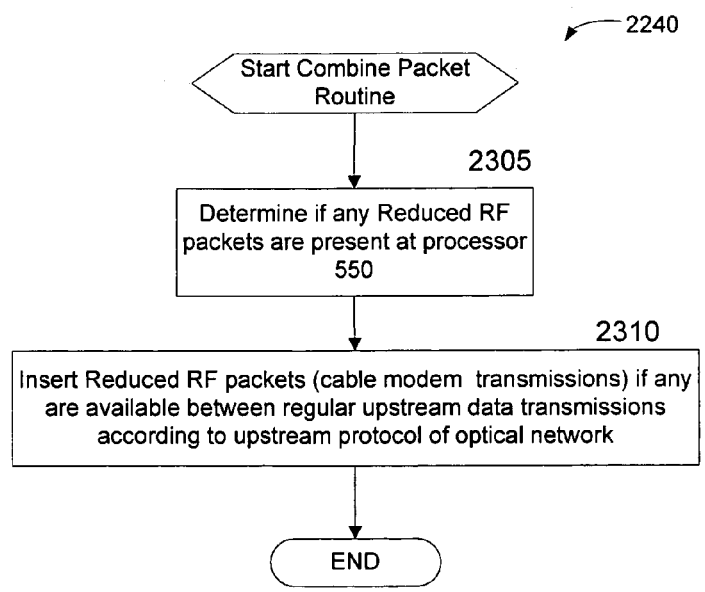
FIG. 21

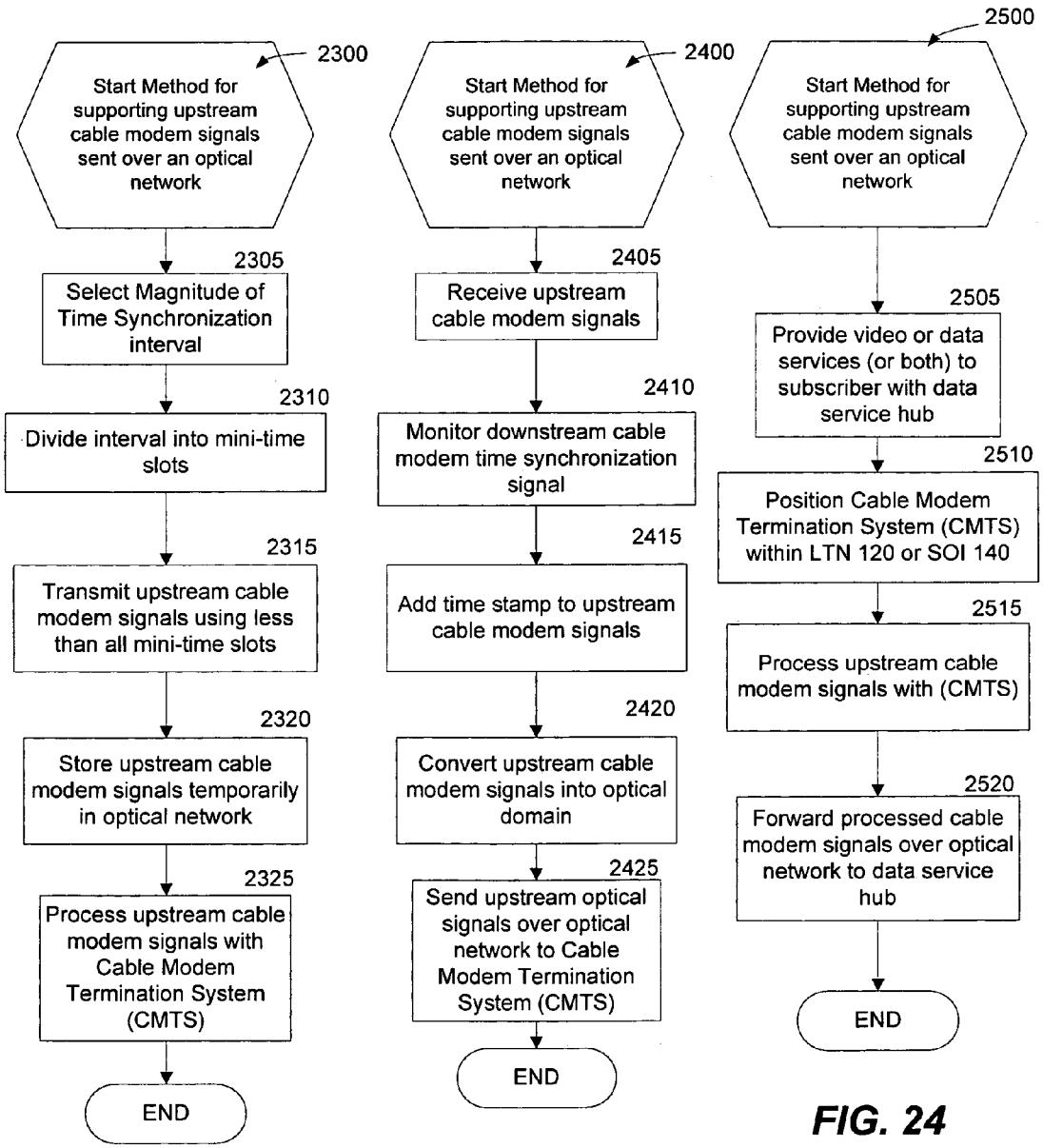

OPTICAL NETWORK SYSTEM AND METHOD FOR SUPPORTING UPSTREAM SIGNALS PROPAGATED ACCORDING TO A CABLE MODEM PROTOCOL

STATEMENT REGARDING RELATED APPLICATIONS

The present application is a continuation-in-part of non-provisional patent application entitled, "Method and System for Providing a Return Path for Signals Generated by Legacy Terminals in an Optical Network," filed on Jan. 8, 2002 and assigned U.S. application Ser. No. 10/041,299 now U.S. Pat. No. 7,184,664; and the present application claims priority to provisional patent application entitled, "Support for DOCSIS Return in Fiber-to-the-Home Systems," filed on Mar. 26, 2005 and assigned U.S. Application Ser. No. 60/665,133. Both the non-provisional and provisional patent applications are hereby incorporated by reference.

TECHNICAL FIELD

The invention relates to video, voice, and data communications. More particularly, the invention relates to a fiber-to-the-home (FTTH) system that is capable of supporting upstream radio-frequency (RF) return signals formatted according to a cable modem protocol that originate from a subscriber and are sent upstream to a data service provider.

BACKGROUND OF THE INVENTION

Conventional cable TV systems use hybrid fiber-coax networks (HFC). These HFC networks typically have a return path implemented in the RF domain and sometimes these HFC networks have certain digital conversions that don't change the nature of the system. These RF return paths transport RF signals from the subscriber to a data service hub. The data service hub can support video and data services for the subscriber. The upstream RF return transmissions from a subscriber of a network are important because they can support functions such as pay-per-view and video-on-demand from video set top terminals (STTs), referred to later as video services terminals (VSTS). Other functions for upstream RF return transmissions include security in cable TV digital rights management (DRM).

These functions usually require that the data service hub learn what programs the subscriber has viewed, so that the data service hub can automatically bill the subscriber and pay program suppliers. The upstream RF return transmissions from a subscriber of a data service hub can also be used for voice and data applications, both of which are two-way by nature. In conventional fiber-to-the-home (FTTH) systems in contrast with HFC systems, an RF return path from the subscriber's home back to the data service hub is usually not feasible because of the digital and packet-switching nature of the optical network.

In addition to this problem of supporting RF return paths in general, FTTH systems also face the problem of supporting RF return transmissions from modems that comply with certain cable modem standards, such as Data-Over-Cable Service Interface Specification (DOCSIS). DOCSIS is one set of conventional standards that define how almost all cable modems work. The standards are well-known to one of ordinary skill in the art. Some conventional solutions exist for supporting cable modem transmissions but these solutions often require modifications of the cable modems that are sold (or have been sold) to customers. Such solutions are costly and require subscribers to either purchase new equipment or modify existing equipment.

Conventional DOCSIS modems are available from a number of manufacturers who specialize in cable modems alone, so it would be impractical to make modifications to the way the DOCSIS modems work in order to service them in a FTTH system. Because of the predominance of DOCSIS in other parts of the world (such as EuroDOCSIS and eDOCSIS), and because of the trend to using DOCSIS in video services terminal communications in North America, there is a need in the art to transport upstream DOCSIS cable modem transmissions from a subscriber over an FTTH system. There is also a need in the art to modify one or more parts of the optical network in a FTTH system so that conventional DOCSIS modems being sold and that have been sold can be supported by the FTTH system.

SUMMARY OF THE INVENTION

A method and system for supporting upstream signals propagated according to a cable modem protocol can comprise modifying a cable modem termination system (CMTS) positioned in a data service hub by overiding the timing scheme used by the CMTS. Specifically, the modification to the CMTS can comprise instructing the CMTS to ignore or skip steps of its timing algorithm. The timing algorithm of the CMTS is usually designed to measure the delay and to advance a respective cable modem's (C/M's) transmit time with respect to the normal start time (as measured at the CMTS) to compensate for the round trip delay in a communications network, such as in a conventional HFC network. In an optical network, in which the return path data is put into packets and combined with all other data being sent upstream, the timing can vary from one instance to the next. Hence, the fixed CMTS timing algorithm for monitoring and adjusting the timing of upstream return data does not work. According to this exemplary embodiment of the invention, the timing algorithm or routine in the CMTS is skipped, and the protocol of the optical network system for upstream data can be used to make sure that data from two cable modem devices do not collide.

The term "upstream" can define a communication direction where a subscriber originates a data signal that is sent upwards towards a data service hub of an optical network. Conversely, the term "downstream" can define a communication direction where a data service hub originates a data signal that is sent downwards towards subscribers of an optical network.

According to another exemplary aspect, a method and system for supporting upstream signals propagated according to a cable modem protocol can comprise monitoring a downstream time synchronization media access control management message sent by a cable modem termination system (CMTS). Alternatively, this time synchronization media access control management message can be produced and sent by a timing circuit that is separate from the CMTS. While monitoring these synchronization messages, a time stamp can be added to the upstream cable modem signals based on the downstream time synchronization media access control management message. This time stamp can be used in the data service hub by the cable modem termination system. The time stamp can allow the upstream cable modem signals to be presented to the cable modem termination system in such manner that any delays due to packet switching or the digital switching nature of the optical network are compensated.

According to another exemplary aspect, a method and system for supporting upstream signals propagated according to a cable modem protocol can comprise adjusting a timing scheme of a cable modem termination system positioned in a data service hub. The adjustment of the timing scheme can include selecting a first magnitude of a downstream time synchronization interval for a cable modem protocol. Next, the downstream time synchronization interval can be divided into a plurality of equally sized upstream transmission time slots or mini-slots. Upstream cable modem signals can then be transmitted over the optical network according to the cable modem protocol and by using these mini-slots or less than a total number of the mini-slots during a given time synchronization interval.

According to one exemplary aspect, alternate min-slots can be used for upstream transmissions. According to another exemplary aspect, mini-slots in a series or sequence can be used and with one or more mini-slots at the end of the series can remain un-used.

According to another exemplary aspect, a method and system for supporting upstream signals propagated according to a cable modem protocol can comprise providing a cable modem termination system (CMTS) positioned or located in a laser transceiver node for processing upstream cable modem signals. According to another exemplary aspect, the CMTS can be positioned or located in subscriber optical interface that is at the entrance of the optical network relative to upstream communications to the data service hub.

BRIEF DESCRIPTION OF THE DRAWINGS

FIG. 1 is a functional block diagram of some core components of an exemplary optical network architecture according to one exemplary embodiment of the invention that can support devices using a cable modem (C/M) protocol.

FIG. 2 is a functional block diagram illustrating additional aspects of an exemplary optical network architecture according to one exemplary embodiment of the invention.

FIG. 7a is a functional block diagram illustrating some core components of a data reducer according to one exemplary embodiment of the invention.

FIG. 7b is a graph illustrating an exemplary Nyquist sampling spectrum of an RF return signal according to one exemplary embodiment of the invention.

FIG. 7c is a graph illustrating an exemplary digitized RF signal that is multiplied by a number representing a sinusoidal waveform.

FIG. 8 is an exemplary functional block diagram that describes further details of a data-to-RF converter according to one exemplary embodiment of the invention.

FIG. 9 is a logic flow diagram illustrating an exemplary method for scaling data received from a video service terminal using the C/M protocol that can be performed by a data scaling unit illustrated in FIG. 7a.

FIG. 10 illustrates an exemplary scaling restoration process according to one exemplary embodiment of the invention.

FIG. 21 is a logic flow diagram illustrating an exemplary subprocess of combining reduced RF packets with regular data packets of a routine in FIG. 22 according to one exemplary embodiment of the invention.

FIG. 22 is a logic flow diagram illustrating an overview of an exemplary process for supporting cable modem signals over an optical network by adjusting the cable modem timing scheme according to one exemplary embodiment of the invention.

FIG. 23 is a logic flow diagram illustrating an overview of an exemplary process for supporting cable modem signals over an optical network by adding a time stamp to the upstream cable modem signals according to one exemplary embodiment of the invention.

FIG. 24 is a logic flow diagram illustrating an overview of an exemplary process for supporting cable modem signals over an optical network by positioning a cable modem termination system within the optical network relative to upstream RF return signals according to one exemplary embodiment of the invention.

DETAILED DESCRIPTION OF EXEMPLARY EMBODIMENTS

Figure 3:
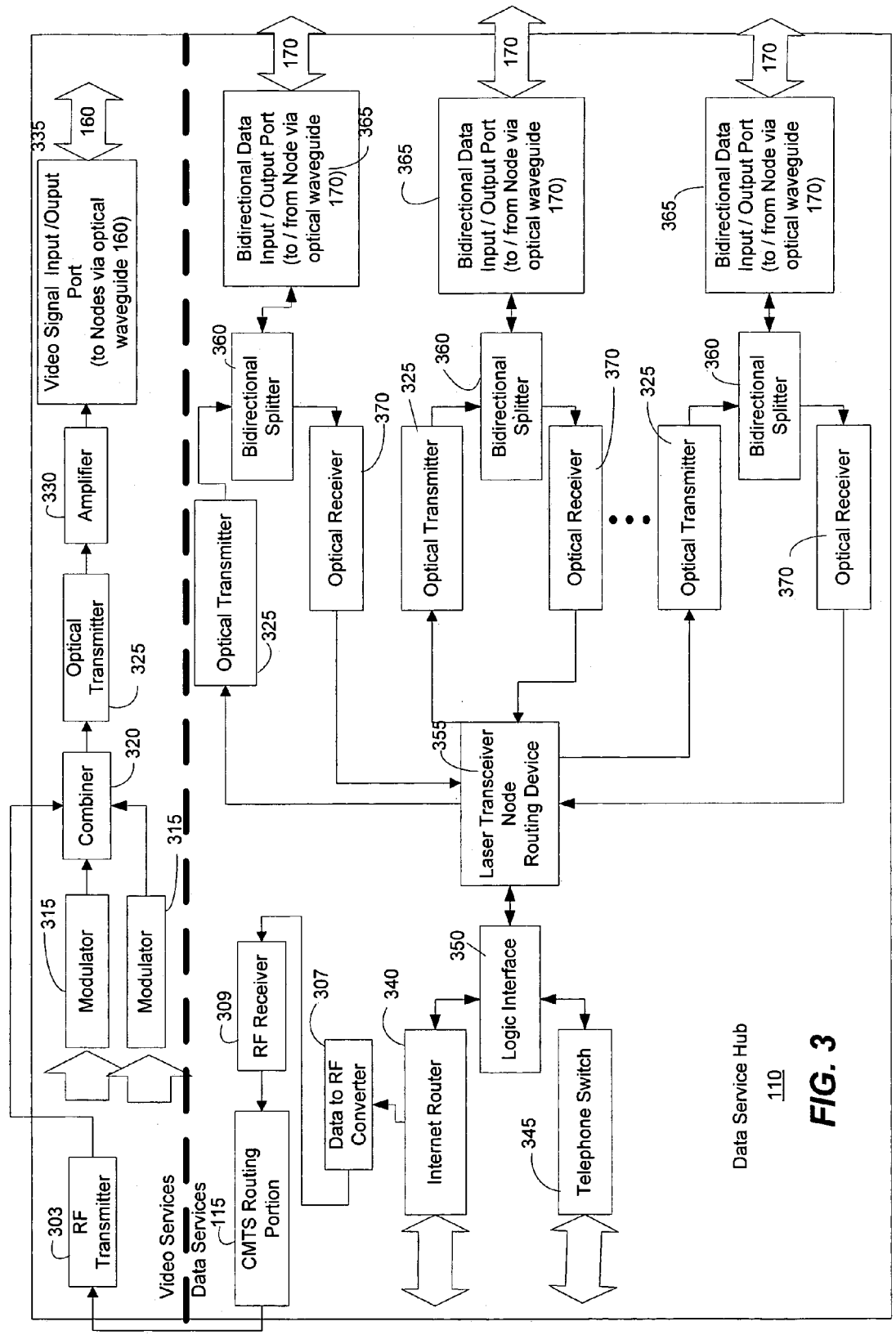
FIG. 3 is a functional block diagram illustrating an exemplary data service hub according to one exemplary embodiment of the invention.

A method and system for supporting upstream signals propagated according to a cable modem protocol can comprise modifying a cable modem termination system (CMTS) positioned in a data service hub by overiding the timing scheme used by the CMTS. Specifically, the modification to the CMTS can comprise instructing the CMTS to ignore or skip steps of its timing algorithm.

According to another exemplary aspect, a method and system for supporting upstream signals propagated according to a cable modem (C/M) protocol can comprise monitoring a downstream time synchronization media access control management message sent by a cable modem termination system. Alternatively, this time synchronization media access control management message can be produced and sent by a timing circuit that is separate from the CMTS. While monitoring these synchronization messages, a time stamp can be added to the upstream cable modem signals.

According to another aspect, a method and system for supporting upstream signals propagated according to a cable modem (C/M) protocol can comprise adjusting a timing scheme of a cable modem termination system positioned in a data service hub, according to one exemplary aspect of the invention. The adjustment of the timing scheme can include selecting a first magnitude of a downstream time synchronization interval for a cable modem protocol and dividing that interval into a plurality of equally sized upstream transmission time slots or mini-slots. Upstream cable modem signals can then be transmitted over the optical network according to the cable modem protocol and by using less than a total number of the mini-slots.

According to another exemplary aspect, a method and system for supporting upstream signals propagated according to a cable modem protocol can comprise providing a cable modem termination system that is positioned within a laser transceiver node or a subscriber optical interface in contrast to positioning the CMTS in a data service hub.

Referring now to the drawings, in which like numerals represent like elements throughout the several Figures, aspects of the invention and the illustrative operating environment will be described.

FIG. 1 is a functional block diagram illustrating an exemplary optical network architecture 100 according to the invention. The exemplary optical network architecture 100 comprises a data service hub 110 that houses a Cable Modem Termination System (CMTS) 111. The CMTS 111 is typically designed to transmit and receive digital radio-frequency (RF) signals. The CMTS 111 can comprise conventional hardware that can support data services such as Internet based communications as well as communications that relate to video services such as impulse-pay-per-view and video-on-demand. Specifically, the CMTS 111 can support incidental communications related to video services. For example, a video service terminal 117 may use cable modem communications to send information concerning what IPPV programs have been watched, and what VOD program is desired. However, the CMTS 111 is not limited to the aforementioned applications and can include other applications that are not beyond the scope and spirit of the invention.

In some exemplary embodiments, the CMTS 111 can be split between two locations. For example, a portion, primarily a data switch, can be located in a first data service hub 110 that services a plurality of second data service hubs 110, while an RF transmitter plus one or more receivers can be located in each second data service hub 110. The first and plurality of second data service hubs 110 can be linked using any of several known communications paths and protocols.

The data service hub 110 is connected to a plurality of laser transceiver nodes 120. The laser transceiver nodes 120, in turn, are each connected to a plurality of optical taps 130. The optical taps 130 can be connected to a plurality of subscriber optical interfaces 140. Connected to each subscriber optical interface 140 can be a cable modem (C/M) video services terminal (VST) 117 that uses a cable modem protocol, such at the Data-Over-Cable Service Interface Specification (DOCSIS). Alternatively, instead of or in addition to the C/M video service terminal 117, a C/M device 119 such as a stand alone cable modem can be coupled to the subscriber optical interface 140.

Both the C/M video services terminal 117 and C/M device 119 are designed to work with the CMTS 111. The C/M video services terminal 117 and C/M device 119 can receive control signals from the CMTS 111 and can transmit RF-modulated return digital signals back to the CMTS 111. The RF-modulated return digital signals may comprise data signals or broadcast video selection options selected by a user. Most legacy C/M video service terminals 117 as of the writing of this description can produce digital signals that are modulated onto an analog RF carrier.

The C/M video services terminal 117 can permit a subscriber to transmit data and/or to select options that are part of various exemplary video services such as impulse-pay-per-view and video-on-demand. However, as noted above with respect to the CMTS 111, the invention is not limited to the aforementioned applications and can include numerous other applications where RF analog signals are used to carry information back to the CMTS 111.

Between respective components of the exemplary optical network architecture 100 are optical waveguides such as optical waveguides 150, 160, 170, and 180. The optical waveguides 150-180 are illustrated by arrows where the arrowheads of the arrows illustrate exemplary directions of data flow between respective components of the illustrative and exemplary optical network architecture 100. While only an individual laser transceiver node 120, an individual optical tap 130, and an individual subscriber optical interface 140 are illustrated in FIG. 1, as will become apparent from FIG. 2 and its corresponding description, a plurality of laser transceiver nodes 120, optical taps 130, and subscriber optical interfaces 140 can be employed without departing from the scope and spirit of the invention. Typically, in many of the exemplary embodiments of the RF return system of the invention, multiple subscriber optical interfaces 140 are connected to one or more optical taps 130.

The laser transceiver node 120 can allocate additional or reduced bandwidth based upon the demand of one or more subscribers that use the subscriber optical interfaces 140. The laser transceiver node 120 can be designed to withstand outdoor environmental conditions and can be designed to hang on a strand or fit in a pedestal or "hand hold." The laser transceiver node can operate in a temperature range between minus 40 degrees Celsius to plus 60 degrees Celsius. The laser transceiver node 120 can operate in this temperature range by using passive cooling devices that do not consume power.

Unlike the conventional routers disposed between the subscriber optical interface 140 and data service hub 110, the laser transceiver node 120 does not require active cooling and heating devices that control the temperature surrounding the laser transceiver node 120. The RF system of the invention attempts to place more of the decision-making electronics at the data service hub 110 instead of the laser transceiver node 120. Typically, the decision-making electronics are larger in size and produce more heat than the electronics placed in the laser transceiver node of the invention. Because the laser transceiver node 120 does not require active temperature controlling devices, the laser transceiver node 120 lends itself to a compact electronic packaging volume that is typically smaller than the environmental enclosures of conventional routers. Further details of the components that make up the laser transceiver node 120 will be discussed in further detail below with respect to FIG. 5.

In one exemplary embodiment of the invention, three trunk optical wave guides 160, 170, and 180 (that can comprise optical fibers) can propagate optical signals from the data service hub 110 to the laser transceiver node 120. It is noted that the term "optical waveguide" used in this description can apply to optical fibers, planar light guide circuits, and fiber optic pigtails and other like optical waveguide components that are used to form an optical architecture.

A first optical waveguide 160 can carry downstream broadcast video and control signals generated by the CMTS 111. The signals can be carried in a traditional cable television format wherein the broadcast signals are modulated onto carriers, which in turn, modulate an optical transmitter (not shown in this Figure) in the data service hub 110. The first optical waveguide 160 can also carry upstream RF signals that are generated by respective video service terminals 117. Further details of the format of the upstream RF signals will be discussed below.

A second optical waveguide 170 can carry downstream targeted services such as data and telephone services to be delivered to one or more subscriber optical interfaces 140. In addition to carrying subscriber-specific optical signals, the second optical waveguide 170 can also propagate internet protocol multicast packets, as is understood by one of ordinary skill in the art.

In one exemplary embodiment, a third optical waveguide 180 can transport data signals upstream from the laser transceiver node 120 to the data service hub 110. The optical signals propagated along the third optical waveguide 180 can also comprise data and telephone services received from one or more subscribers. Similar to the second optical waveguide 170, the third optical waveguide 180 can also carry IP broadcast packets, as is understood by one of ordinary skill in the art.

The third or upstream optical waveguide 180 is illustrated with dashed lines to indicate that it is merely an option or part of one exemplary embodiment according to the invention. In other words, the third optical waveguide 180 can be removed. In another exemplary embodiment, the second optical waveguide 170 propagates optical signals in both the upstream and downstream directions as is illustrated by the double arrows depicting the second optical waveguide 170.

In such an exemplary embodiment where the second optical waveguide 170 propagates bidirectional optical signals, only two optical waveguides 160, 170 would be needed to support the optical signals propagating between the data server's hub 110 in the laser transceiver node 120. In another exemplary embodiment (not shown), a single optical waveguide can be the only link between the data service hub 110 and the laser transceiver node 120. In such a single optical waveguide embodiment, three different wavelengths can be used for the upstream and downstream signals. Alternatively, bidirectional data could be modulated on one wavelength.

In one exemplary embodiment, the optical tap 130 can comprise an 8-way optical splitter. This means that the optical tap 130 comprising an 8-way optical splitter can divide downstream optical signals eight ways to serve eight different subscriber optical interfaces 140. In the upstream direction, the optical tap 130 can combine the optical signals received from the eight subscriber optical interfaces 140. In another exemplary embodiment, the optical tap 130 can comprise a 4-way splitter to service four subscriber optical interfaces 140.

Yet in another exemplary embodiment, the optical tap 130 can further comprise a 4-way splitter that is also a passthrough tap meaning that a portion of the optical signal received at the optical tap 130 can be extracted to serve the 4-way splitter contained therein while the remaining optical energy is propagated further downstream to another optical tap or another subscriber optical interface 140. The invention is not limited to 4-way and 8-way optical splitters. Other optical taps having fewer or more than 4-way or 8-way splits are not beyond the scope of the invention. For example, some optical splitters can comprise 32 or 64 way splits.

According to alternate exemplary embodiment (not illustrated), the laser transceiver node 120 could be positioned within the data service hub 110. In such an exemplary embodiment, the optical waveguides 160, 170, and 180 could be substantially reduced in length or eliminated so that communications from the laser transceiver node 120 would propagate completely in the electrical domain to the hardware in the data service hub 110.

Referring now to FIG. 2, this Figure is a functional block diagram illustrating an exemplary optical network architecture 100 that further includes subscriber groupings 200 that correspond with a respective laser transceiver node 120. FIG. 2 illustrates the diversity of the exemplary optical network architecture 100 where a number of optical waveguides 150 connected between the laser transceiver node 120 and the optical taps 130 is minimized. FIG. 2 also illustrates the diversity of subscriber groupings 200 that can be achieved with the optical tap 130.

Each optical tap 130 can comprise an optical splitter. The optical tap 130 allows multiple subscriber optical interfaces 140 to be coupled to a single optical waveguide 150 that is connected to the laser transceiver node 120. In one exemplary embodiment, six optical fibers 150 are designed to be connected to the laser transceiver node 120. Through the use of the optical taps 130, sixteen subscribers can be assigned to each of the six optical fibers 150 that are connected to the laser transceiver node 120.

In another exemplary embodiment, twelve optical fibers 150 can be connected to the laser transceiver node 120 while eight subscriber optical interfaces 140 are assigned to each of the twelve optical fibers 150. One of ordinary skill in the art will appreciate that the number of subscriber optical interfaces 140 assigned to a particular waveguide 150 that is connected between the laser transceiver node 120 and a subscriber optical interface 140 (by way of the optical tap 130) can be varied or changed without departing from the scope and spirit of the invention. Further, one of ordinary skill in the art recognizes that the actual number of subscriber optical interfaces 140 assigned to the particular fiber optic cable is dependent upon the amount of power available on a particular optical fiber 150.

As depicted in subscriber grouping 200, many configurations for supplying communication services to subscribers are possible. For example, while optical tap 130$_A$ can connect subscriber optical interfaces 140$_{A1}$ through subscriber optical interface 140$_{AN}$ to the outdoor laser transmitter node 120, optical tap 130$_A$ can also connect other optical taps 130 such as optical tap 130$_{AN}$ to the laser transceiver node 120. The combinations of optical taps 130 with other optical taps 130 in addition to combinations of optical taps 130 with subscriber optical interfaces 140 are limitless. With the optical taps 130, concentrations of distribution optical waveguides 150 at the laser transceiver node 120 can be reduced. Additionally, the total amount of fiber needed to service a subscriber grouping 200 can also be reduced.

With the active laser transceiver node 120 of the invention, the distance between the laser transceiver node 120 and the data service hub 110 can comprise a range between 0 and 80 kilometers. However, the invention is not limited to this range. One of ordinary skill in the art will appreciate that this range can be expanded by selecting various off-the-shelf components that make up several of the devices of the present system. One of ordinary skill in the art will also appreciate that other configurations of the optical waveguides disposed between the data service hub 110 and laser transceiver node 120 are not beyond the scope of the invention. Because of the bi-directional capability of optical waveguides, variations in the number and directional flow of the optical waveguides disposed between the data service hub 110 and the laser transceiver node 120 can be made without departing from the scope and spirit of the invention.

Referring now to FIG. 3, this functional block diagram illustrates an exemplary data service hub 110 of the invention. The exemplary data service hub 110 illustrated in FIG. 3 is designed for a two trunk optical waveguide system. That is, this data service hub 110 of FIG. 3 is designed to send and receive optical signals to and from the laser transceiver node 120 along the first optical waveguide 160 and the second optical waveguide 170. With this exemplary embodiment, both the first optical waveguide 160 and the second optical waveguide 170 support bi-directional data flow. In this way, the third optical waveguide 180 discussed above is not needed.

The data service hub 110 can comprise one or more modulators 315 that are designed to support television broadcast services. The one or more modulators 315 can be analog or digital type modulators. In one exemplary embodiment, there can be at least 78 modulators 315 present in the data service hub 110. One of ordinary skill in the art will appreciate that the number of modulators 315 can be varied without departing from the scope and spirit of the invention.

The RF downstream signals from the modulators 315 are combined in a combiner 320. The optical signals generated by the optical transmitter 325 are propagated to amplifier 330 such as an Erbium Doped Fiber Amplifier (EDFA) where the optical signals are amplified. The amplified optical signals are then propagated out of the data service hub 110 via a bi-directional video signal input/output port 335 which is connected to one or more first optical waveguides 160. The bi-directional video signal input/output port 335 is connected to one or more first optical waveguides 160 that support bi-directional optical signals originating from the data service hub 110 and video services terminals 117.

One of ordinary skill in the art will recognize that a number of variations of this signal flow are possible without departing from the scope and spirit of the invention. Also, broadcast video signals may be generated at another data service hub 110 and sent to the data service hub 110 of FIG. 3 using any of a plurality of different transmission methods known to these skilled in the art. For example, some portion of the video signals may be generated and converted to optical form at a remote first data service hub 110. At a second data service hub 110, they may be combined with other signals generated locally.

The optical transmitter 325 can comprise one of Fabry-Perot (F-P) Laser Transmitters, distributed feedback lasers (DFBs), or Vertical Cavity Surface Emitting Lasers (VC-SELs). However, other types of optical transmitters are possible and are not beyond the scope of the invention. With the aforementioned optical transmitters 325, the data service hub 110 lends itself to efficient upgrading by using off-the-shelf hardware to generate optical signals.

To support data services or to support incidental services related to the downstream video services, a data-to-RF converter 307 that transforms RF return packets back into their original RF analog electrical format can be coupled to an Internet Router 340. Further details of RF converter 307 will be discussed below with respect to FIG. 8. The RF analog electrical signals generated by the data-to-RF converter 307 are demodulated by an RF receiver 309. The demodulated signals are then propagated to the CMTS Routing Portion 115. The CMTS Routing portion 115 of the CMTS system 111 can also send downstream timing signals to an RF transmitter 303 that modulates the downstream timing signals onto a radio-frequency (RF) carrier. The RF transmitter 303 can be coupled to the combiner 320 in which the downstream timing signals from the CMTS routing portion 115 can be combined with the RF signals from the video service modulators 315.

The data service hub 110 can further comprise a telephone switch 345 that supports telephony service to the subscribers of the optical network system 100. However, other telephony service such as Internet Protocol telephony can be supported by the data service hub 110. If only Internet Protocol telephony is supported by the data service hub 110, then it is apparent to one of ordinary skill in the art that the telephone switch 345 could be eliminated in favor of lower cost VoIP equipment. For example, in another exemplary embodiment (not shown), the telephone switch 345 could be substituted with other telephone interface devices such as a soft switch and gateway. But if the telephone switch 345 is needed, it may be located remotely from the data service hub 110 and can be connected through any of several conventional methods of interconnection.

The data service hub 110 can further comprise a logic interface 350 that is connected to a laser transceiver node routing device 355. The laser transceiver node routing device 355 can comprise a conventional router that supports an interface protocol for communicating with one or more laser transceiver nodes 120. This interface protocol can comprise one of gigabit or faster Ethernet, Internet Protocol (IP) or SONET protocols. However, the invention is not limited to these protocols. Other protocols can be used without departing from the scope and spirit of the invention.

The logic interface 350 and laser transceiver node routing device 355 can read packet headers originating from the laser transceiver nodes 120 and the internet router 340. The logic interface 350 can also translate interfaces with the telephone switch 345. After reading the packet headers, the logic interface 350 and laser transceiver node routing device 355 can determine where to send the packets of information.

The laser transceiver node routing device 355 can supply downstream data signals to respective optical transmitters 325. The data signals converted by the optical transmitters 325 can then be propagated to a bi-directional splitter 360. The optical signals sent from the optical transmitter 325 into the bidirectional splitter 360 can then be propagated towards a bi-directional data input/output port 365 that is connected to a second optical waveguide 170 that supports bi-directional optical data signals between the data service hub 110 and a respective laser transceiver node 120.

Upstream optical signals received from a respective laser transceiver node 120 can be fed into the bi-directional data input/output port 365 where the optical signals are then forwarded to the bi-directional splitter 360. From the bi-directional splitter 360, respective optical receivers 370 can convert the upstream optical signals into the electrical domain. The upstream electrical signals generated by respective optical receivers 370 are then fed into the laser transceiver node routing device 355. As noted above, each optical receiver 370 can comprise one or more photoreceptors or photodiodes that convert optical signals into electrical signals.

When distances between the data service hub 110 and respective laser transceiver nodes 120 are modest, the optical transmitters 325 can propagate optical signals at 1310 nm. But where distances between the data service hub 110 and the laser transceiver node are more extreme, the optical transmitters 325 can propagate the optical signals at wavelengths of 1550 nm with or without appropriate amplification devices.

One of ordinary skill in the art will appreciate that the selection of optical transmitters 325 for each circuit may be optimized for the optical path lengths needed between the data service hub 110 and the laser transceiver node 120. Further, one of ordinary skill in the art will appreciate that the wavelengths discussed are practical but are only illustrative in nature. In some scenarios, it may be possible to use communication windows at 1310 and 1550 nm in different ways without departing from the scope and spirit of the invention. Further, the invention is not limited to a 1310 and 1550 nm wavelength regions. One of ordinary skill in the art will appreciate that smaller or larger wavelengths for the optical signals are not beyond the scope and spirit of the invention.

Figure 4:
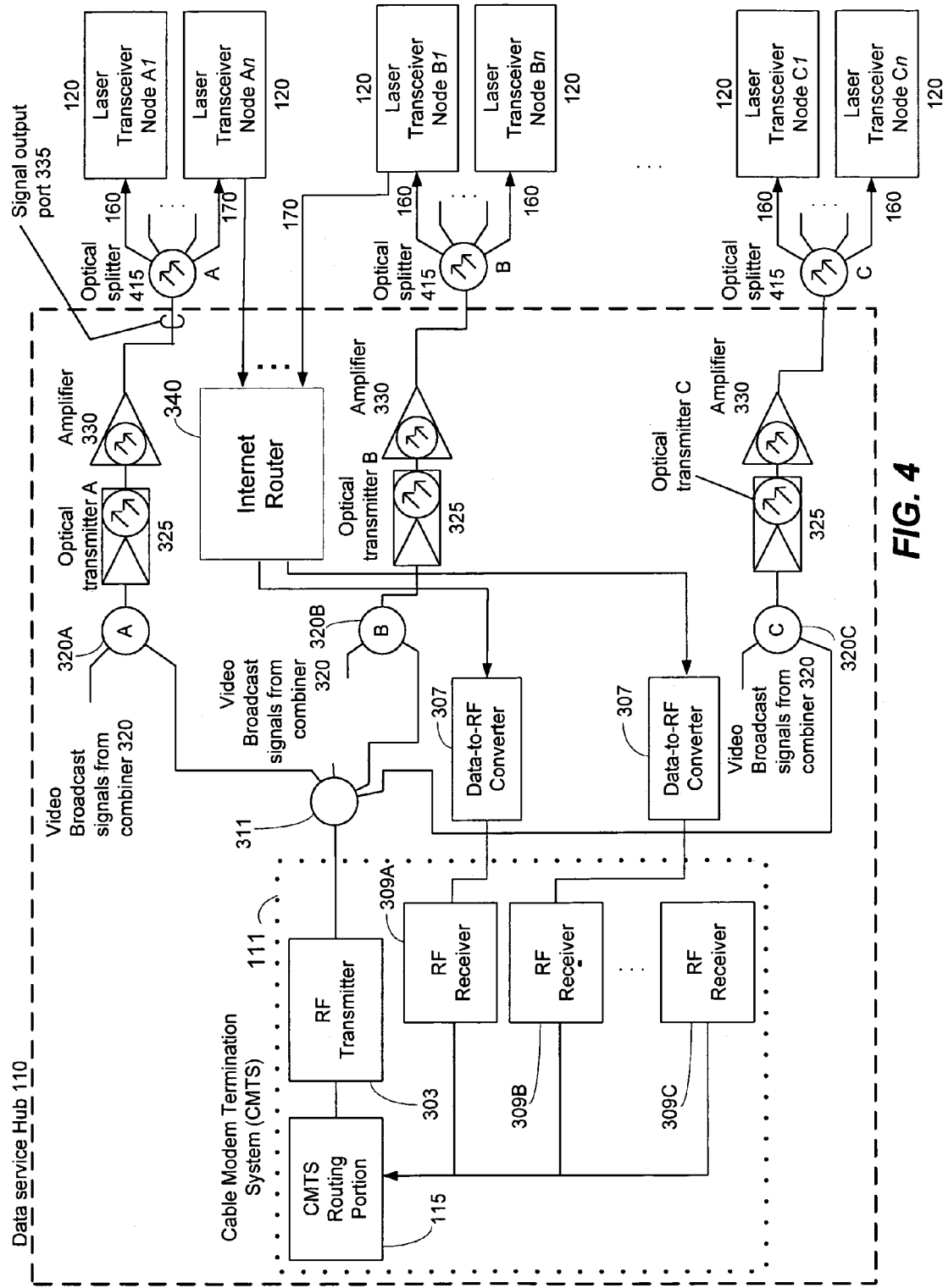
FIG. 4 is a functional block diagram illustrating an exemplary data service hub that supports multiple upstream RF Return signals using the C/M protocol and originating from multiple C/M video service terminals and/or C/M devices according to one exemplary embodiment of the invention.

Referring now to FIG. 4, this Figure illustrates a functional block diagram of an exemplary data service hub 110 that provides additional detail of hardware that supports multiple upstream RF Return signals using the C/M protocol and originating from multiple C/M video service terminals 117 and/or C/M devices 119. Some of the details of the hardware handling regular downstream and upstream data is omitted from FIG. 4.

Only the differences between FIG. 4 and FIG. 3 will be discussed below. An electrical splitter 311 is coupled to the CMTS RF transmitter 303. The electrical splitter 311 divides the C/M control and downstream data signals from the CMTS routing portion 115 between combiners 320A, 320B and 320C. Broadcast signals from other combiners 320 are also fed into the aforementioned combiners 320A, 320B and 320C.

The electrical splitter 311 can divide the output of the CMTS RF transmitter 303 to provide C/M control signals to a plurality of optical nodes 120 and ultimately a plurality of C/M video service terminals 117 or C/M devices 119 or both. The output of each combiner 320A, 320B and 320C is fed into a respective optical transmitter 325, which in turn, is fed into an optical amplifier 330 as required. The signals from each optical amplifier are fed into a respective optical splitter 415. And in one exemplary embodiment, the downstream broadcast and C/M control signals are carried at 1550 nanometers.

Upstream optical RF packets are transported through the data portion of the Data Service Hub, and then supplied to Data-to-RF Converter 307. The data-to-RF converters 307 are coupled to the CMTS RF receivers 309.

In a slightly different embodiment (not illustrated), the demodulation function performed in RF receivers 309 in the data service hub 110 can be moved to the subscriber optical Interface 140, and incorporated in the data reducer 511. The advantage of incorporating the RF receivers 309 in this manner is that there is less data to be transported than in the digitized RF modulated data. And this means that a smaller packet would be transmitted upstream. The disadvantage is that one RF receiver 309 would have to be provided at the home of every subscriber. The RF receiver 309 is more complex than is digitization of the RF return signals as illustrated in FIG. 7a, so overall costs would be higher.

Figure 5:
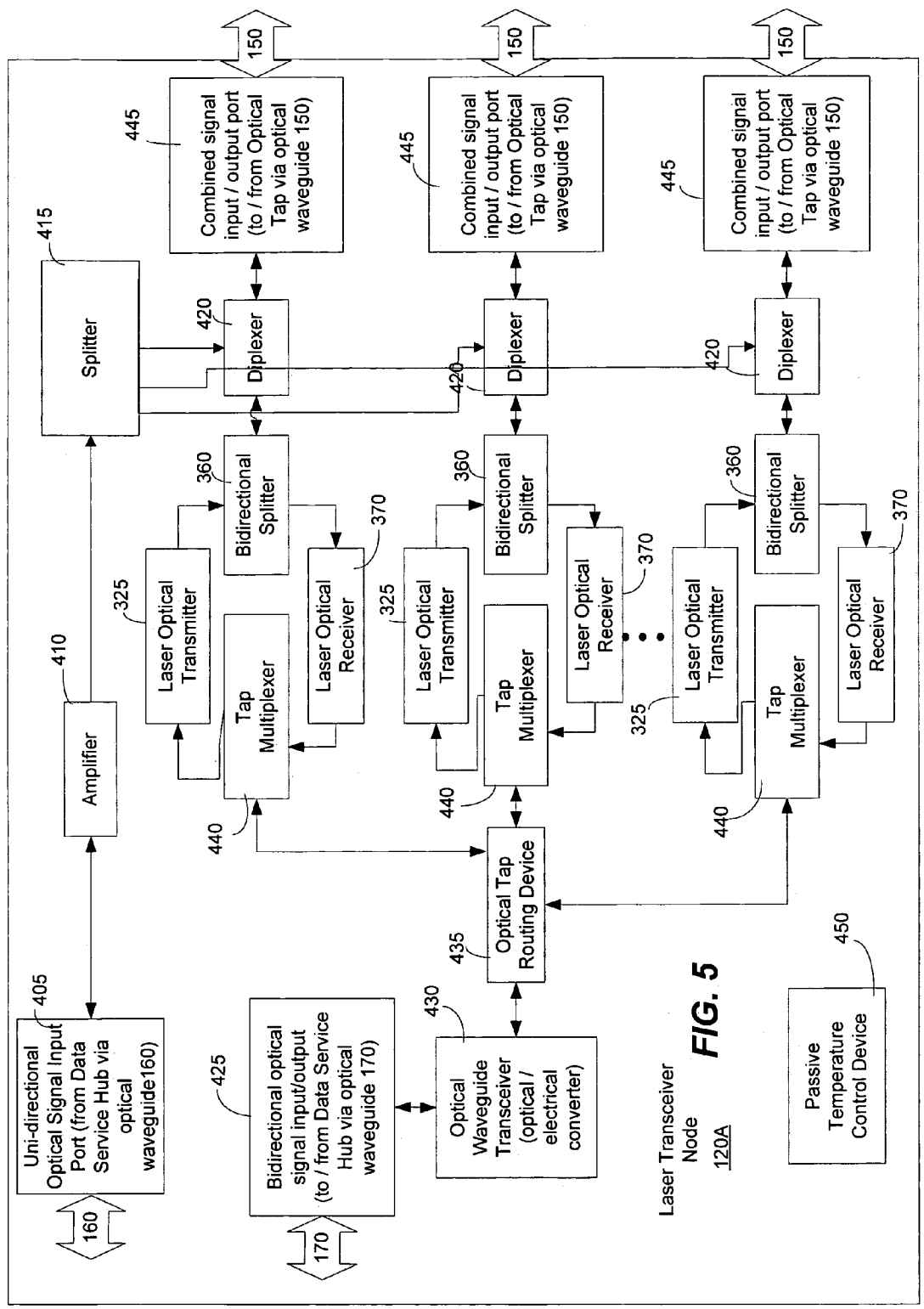
FIG. 5 is a functional block diagram illustrating an exemplary transceiver node according to one exemplary embodiment of the invention.

Referring now to FIG. 5, this Figure illustrates a functional block diagram of an exemplary laser transceiver node 120A of the invention. In this exemplary embodiment, the laser transceiver node 120A can comprise a uni-directional optical signal input port 405 that can receive optical signals propagated from the data service hub 110 that are propagated along a first optical waveguide 160. The optical signals received at the uni-directional optical signal input port 405 can comprise downstream broadcast video data, downstream video service control signals, and downstream cable modem packets.

The downstream optical signals received at the input port 405 are propagated to an amplifier 410 such as an Erbium Doped Fiber Amplifier (EDFA) in which the optical signals are amplified. The amplified optical signals are then propagated to an optical splitter 415 that divides the downstream broadcast video optical signals and video service control signals among diplexers 420 that are designed to forward optical signals to predetermined subscriber groups 200.

The laser transceiver node 120A can further comprise a bidirectional optical signal input/output port 425 that connects the laser transceiver node 120A to a second optical waveguide 170 that supports bidirectional data flow between the data service hub 110 and laser transceiver node 120. Downstream optical signals flow through the bi-directional optical signal input/output port 425 to an optical waveguide transceiver 430 that converts downstream optical signals into the electrical domain. The optical waveguide transceiver 430 further converts upstream electrical signals into the optical domain. The optical waveguide transceiver 430 can comprise an optical/electrical converter and an electrical/optical converter.

Downstream and upstream electrical signals are communicated between the optical waveguide transceiver 430 and an optical tap routing device 435. The optical tap routing device 435 can manage the interface with the data service hub optical signals and can route or divide or apportion the data service hub signals according to individual tap multiplexers 440 that communicate optical signals with one or more optical taps 130 and ultimately one or more subscriber optical interfaces 140. It is noted that tap multiplexers 440 operate in the electrical domain to modulate laser transmitters in order to generate optical signals that are assigned to groups of subscribers coupled to one or more optical taps.

Optical tap routing device 435 is notified of available upstream data packets and upstream RF packets as they arrive, by each tap multiplexer 440. The optical tap routing device is connected to each tap multiplexer 440 to receive these upstream data and RF packets. The optical tap routing device 435 relays the packets to the data service hub 110 via the optical waveguide transceiver 430 and bidirectional optical signal input/output 425. The optical tap routing device 435 can build a lookup table from these upstream data packets coming to it from all tap multiplexers 440 (or ports), by reading the source IP address of each packet, and associating it with the tap multiplexer 440 through which it came.

Referring back to the optical tap routing device 435, the aforementioned lookup table can be used to route packets in the downstream path. As each downstream data packet comes in from the optical waveguide transceiver 430, the optical tap routing device looks at the destination IP address (which is the same as the source IP address for the upstream packets).

From the lookup table the optical tap routing device 435 can determine which port (or, tap multiplexer 440) is connected to that IP address, so it sends the packet to that port. This can be described as a normal layer 3 router function as is understood by one of ordinary skill in the art.

The optical tap routing device 435 can assign multiple subscribers to a single port. More specifically, the optical tap routing device 435 can service groups of subscribers with corresponding respective, single ports. The optical taps 130 coupled to respective tap multiplexers 440 can supply downstream optical signals to pre-assigned groups of subscribers who receive the downstream optical signals with the subscriber optical interfaces 140.

In other words, the optical tap routing device 435 can determine which tap multiplexers 440 is to receive a downstream electrical signal, or identify which tap multiplexer 440 propagated an upstream optical signal (that is received as an electrical signal). The optical tap routing device 435 can format data and implement the protocol required to send and receive data from each individual subscriber connected to a respective optical tap 130. The optical tap routing device 435 can comprise a computer or a hardwired apparatus that executes a program defining a protocol for communications with groups of subscribers assigned to individual ports. Exemplary embodiments of programs defining the protocol is discussed in the following copending and commonly assigned non-provisional patent applications, the entire contents of which are hereby incorporated by reference: "Method and System for Processing Downstream Packets of an Optical Network," filed on Oct. 26, 2001 in the name of Stephen A. Thomas et al. and assigned U.S. Ser. No. 10/045,652 (Pub. No. 2003/0086140); and "Method and System for Processing Upstream Packets of an Optical Network," filed on Oct. 26, 2001 in the name of Stephen A. Thomas et al. and assigned U.S. Ser. No 10/045,584 (Pub. No. 2003/0016692).

The single ports of the optical tap routing device are connected to respective tap multiplexers 440. With the optical tap routing device 435, the laser transceiver node 120 can adjust a subscriber's bandwidth on a subscription basis or on an as-needed or demand basis. The laser transceiver node 120 via the optical tap routing device 435 can offer data bandwidth to subscribers in pre-assigned increments. For example, the laser transceiver node 120 via the optical tap routing device 435 can offer a particular subscriber or groups of subscribers bandwidth in units of 1, 2, 5, 10, 20, 50, 100, 200, and 450 Megabits per second (Mb/s). One of ordinary skill in the art will appreciate that other subscriber bandwidth units are not beyond the scope of the invention.

Electrical signals are communicated between the optical tap routing device 435 and respective tap multiplexers 440. The tap multiplexers 440 propagate optical signals to and from various groupings of subscribers by way of laser optical transmitter 325 and laser optical receiver 370. Each tap multiplexer 440 is connected to a respective optical transmitter 325. As noted above, each optical transmitter 325 can comprise one of a Fabry-Perot (F-P) laser, a distributed feedback laser (DFB), or a Vertical Cavity Surface Emitting Laser (VCSEL). The optical transmitters produce the downstream optical signals that are propagated towards the subscriber optical interfaces 140. Each tap multiplexer 440 is also coupled to an optical receiver 370. Each optical receiver 370, as noted above, can comprise photoreceptors or photodiodes. Since the optical transmitters 325 and optical receivers 370 can comprise off-the-shelf hardware to generate and receive respective optical signals, the laser transceiver node 120 lends itself to efficient upgrading and maintenance to provide significantly increased data rates.

Each optical transmitter 325 and each optical receiver 370 are connected to a respective bi-directional splitter 360. Each bi-directional splitter 360 in turn is connected to a diplexer 420 which combines the unidirectional optical signals received from the splitter 415 with the downstream optical signals received from respective optical receivers 370. In this way, broadcast video services as well as data services can be supplied with a single optical waveguide such as a distribution optical waveguide 150 as illustrated in FIG. 2. In other words, optical signals can be coupled from each respective diplexer 420 to a combined signal input/output port 445 that is connected to a respective distribution optical waveguide 150.

Unlike the conventional art, the laser transceiver node 120 does not employ a conventional router. The components of the laser transceiver node 120 can be disposed within a compact electronic packaging volume. For example, the laser transceiver node 120 can be designed to hang on a strand or fit in a pedestal similar to conventional cable TV equipment that is placed within the "last," mile or subscriber proximate portions of a network. It is noted that the term, "last mile," is a generic term often used to describe the last portion of an optical network that connects to subscribers.

Also because the optical tap routing device 435 is not a conventional router, it does not require active temperature controlling devices to maintain the operating environment at a specific temperature. Optical tap routing device 435 does not need active temperature controlling devices because it can be designed with all temperature-rated components. In other words, the laser transceiver node 120 can operate in a temperature range between minus 40 degrees Celsius to 60 degrees Celsius in one exemplary embodiment.

While the laser transceiver node 120 does not comprise active temperature controlling devices that consume power to maintain temperature of the laser transceiver node 120 at a single temperature, the laser transceiver node 120 can comprise one or more passive temperature controlling devices 450 that do not consume power. The passive temperature controlling devices 450 can comprise one or more heat sinks or heat pipes that remove heat from the laser transceiver node 120. One of ordinary skill in the art will appreciate that the invention is not limited to these exemplary passive temperature controlling devices. Further, one of ordinary skill in the art will also appreciate the invention is not limited to the exemplary operating temperature range disclosed. With appropriate passive temperature controlling devices 450, the operating temperature range of the laser transceiver node 120 can be reduced or expanded.

In addition to the laser transceiver node's 120 ability to withstand harsh outdoor environmental conditions, the laser transceiver node 120 can also provide high speed symmetrical data transmissions. In other words, the laser transceiver node 120 can propagate the same bit rates downstream and upstream to and from a network subscriber. This is yet another advantage over conventional networks, which typically cannot support symmetrical data transmissions as discussed in the background section above. Further, the laser transceiver node 120 can also serve a large number of subscribers while reducing the number of connections at both the data service hub 110 and the laser transceiver node 120 itself.

The laser transceiver node 120 also lends itself to efficient upgrading that can be performed entirely on the network side or data service hub 110 side. That is, upgrades to the hardware forming the laser transceiver node 120 can take place in locations between and within the data service hub 110 and the laser transceiver node 120. This means that the subscriber side of the network (from distribution optical waveguides 150 to the subscriber optical interfaces 140) can be left entirely in-tact during an upgrade to the laser transceiver node 120 or data service hub 110 or both.

Figure 6A:
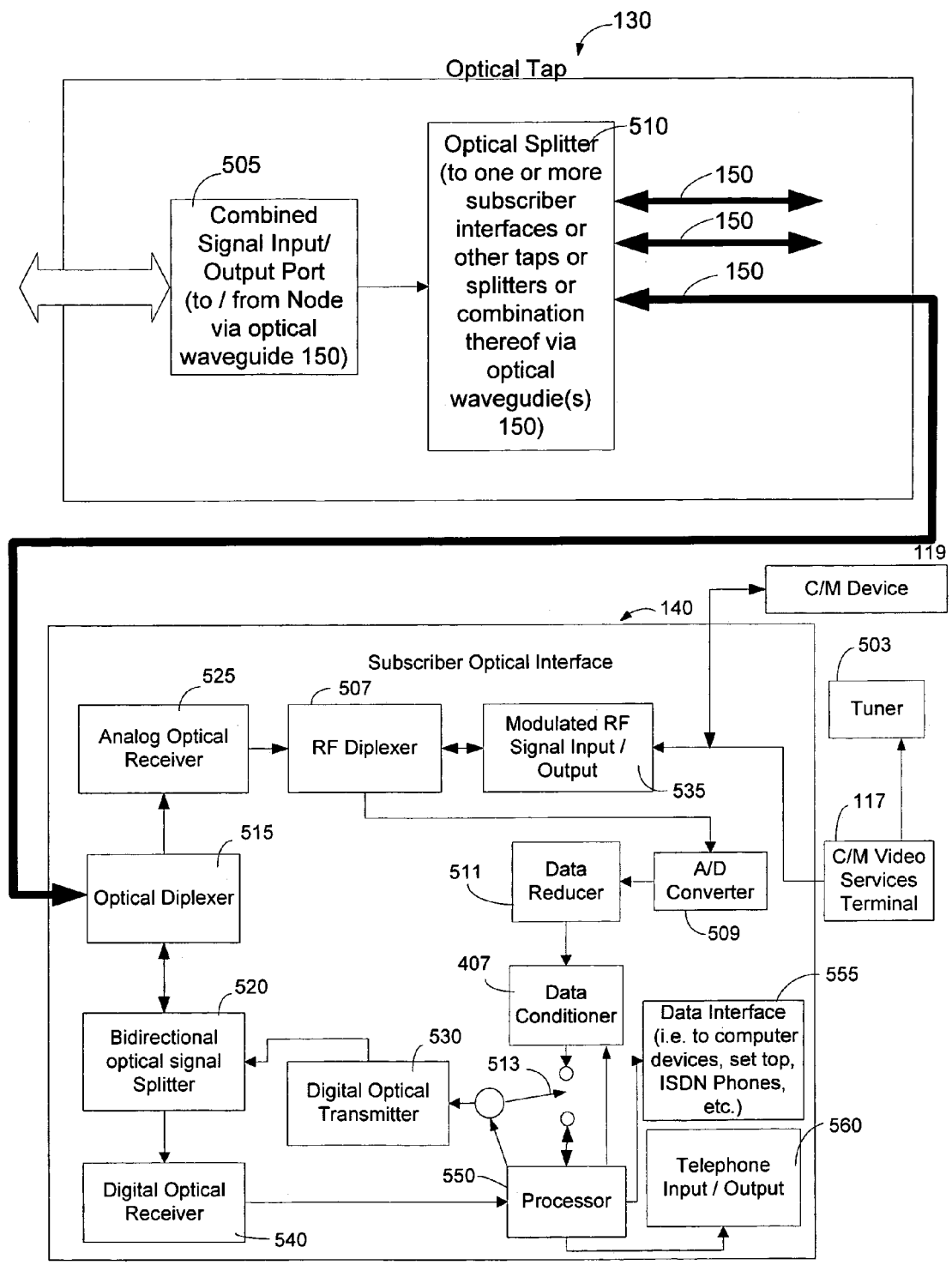
FIG. 6A is a functional block diagram illustrating an optical tap connected to a subscriber optical interface by a optical wave guide according to one exemplary embodiment of the invention.

Referring now to FIG. 6A, this Figure is a functional block diagram illustrating an optical tap 130 connected to a subscriber optical interface 140 by a single optical waveguide 150 according to one exemplary embodiment of the invention. The optical tap 130 can comprise a combined signal input/output port that is connected to another distribution optical waveguide that is connected to a laser transceiver node 120. As noted above, the optical tap 130 can comprise an optical splitter 510 that can be a 4-way or 8-way optical splitter. Other optical taps having fewer or more than 4-way or 8-way splits are not beyond the scope of the invention.

The optical tap 130 can divide downstream optical signals to serve respective subscriber optical interfaces 140. In the exemplary embodiment in which the optical tap 130 comprises a 4-way optical tap, such an optical tap can be of the pass-through type, meaning that a portion of the downstream optical signals is extracted or divided to serve a 4-way splitter contained therein, while the rest of the optical energy is passed further downstream to other distribution optical waveguides 150.

The optical tap 130 is an efficient coupler that can communicate optical signals between the laser transceiver node 120 and a respective subscriber optical interface 140. Optical taps 130 can be cascaded, or they can be connected in a star architecture from the laser transceiver node 120. As discussed above, the optical tap 130 can also route signals to other optical taps that are downstream relative to a respective optical tap 130.

The optical tap 130 can also connect to a limited or small number of optical waveguides so that high concentrations of optical waveguides are not present at any particular laser transceiver node 120. In other words, in one exemplary embodiment, the optical tap can connect to a limited number of optical waveguides 150 at a point remote from the laser transceiver node 120 so that high concentrations of optical waveguides 150 at a laser transceiver node can be avoided. However, one of ordinary skill in the art will appreciate that the optical tap 130 can be incorporated within the laser transceiver node 120 with respect to another exemplary embodiment (not shown).

The subscriber optical interface 140 functions to convert downstream optical signals received from the optical tap 130 into the electrical domain that can be processed with appropriate communication devices. The subscriber optical interface 140 further functions to convert upstream data and RF packet electrical signals into upstream optical signals that can be propagated along a distribution optical waveguide 150 to the optical tap 130.

The subscriber optical interface 140 can comprise an optical diplexer 515 that divides the downstream optical signals received from the distribution optical waveguide 150 between a bi-directional optical signal splitter 520 and an analog optical receiver 525. The optical diplexer 515 can receive upstream optical signals generated by a digital optical transmitter 530. The digital optical transmitter 530 converts electrical binary/digital signals such as upstream data packets and RF packets to optical form so that the optical signals can be transmitted back to the data service hub 110. Conversely, the digital optical receiver 540 converts optical signals into electrical binary/digital signals so that the electrical data signals can be handled by processor 550. Processor 550 can comprise an application specific integrated circuit (ASIC) in combination with a central processing unit (CPU). However, other hardware implementations are not beyond the scope and spirit of the invention.

The RF return system of the invention can propagate the optical signals at various wavelengths. However, the wavelength regions discussed are practical and are only illustrative of exemplary embodiments. One of ordinary skill in the art will appreciate that other wavelengths that are either higher or lower than or between the 1310 and 1550 nm wavelength regions are not beyond the scope of the invention.

The analog optical receiver 525 can convert the downstream broadcast optical video signals into modulated RF television signals and downstream video service control signals into analog RF signals that are propagated through an RF diplexer 507 and out of the modulated RF signal input/output 535. The modulated RF bidirectional signal input/output 535 can feed into the C/M video services terminal 117. The C/M video services terminal 117 can be coupled to a tuner 503 that comprises a television set or radio. The analog optical receiver 525 can process analog modulated RF transmission as well as digitally modulated RF transmissions for digital TV applications. In the alternative or in addition to the CABLE MODEM (C/M) video services terminal, a CABLE MODEM (C/M) device 119 can also be coupled to the modulated RF bidirectional signal input/output port 535. The C/M device 119 can comprise many different types of equipment that support the C/M standard. For example, the C/M device 119 could comprise a cable modem that is coupled to a computer. The C/M could also be incorporated within a telephone adaptor, which supports any one of several known voice protocols. Other applications for C/M device 119 are not beyond the scope of the invention.

The bi-directional optical signal splitter 520 can propagate combined optical signals in their respective directions. That is, downstream optical signals entering the bi-directional optical splitter 520 from the optical the optical diplexer 515, are propagated to the digital optical receiver 540. Upstream optical signals entering it from the digital optical transmitter 530 are sent to optical diplexer 515 and then to optical tap 130. The bi-directional optical signal splitter 520 is connected to a digital optical receiver 540 that converts downstream data optical signals into the electrical domain. Meanwhile the bidirectional optical signal splitter 520 is also connected to a digital optical transmitter 530 that converts upstream data packet and RF packet electrical signals into the optical domain.

The digital optical receiver 540 can comprise one or more photoreceptors or photodiodes that convert optical signals into the electrical domain. The digital optical transmitter 530 can comprise one or more lasers such as the Fabry-Perot (F-P) Lasers, distributed feedback lasers, and Vertical Cavity Surface Emitting Lasers (VCSELs). Other types of lasers are within the scope and spirit of the invention.

The digital optical receiver 540 and digital optical transmitter 530 are connected to a processor 550 that selects data intended for the instant subscriber optical interface 140 based upon an embedded address. The data handled by the processor 550 can comprise one or more of telephony and data services such as an Internet service. The processor 550 is connected to a telephone input/output 560 that can comprise an analog interface. The processor 550 is also connected to a data interface 555 that can provide a link to computer devices, ISDN phones, and other like devices. Alternatively, the data interface 555 can comprise an interface to a Voice over Internet Protocol (VoIP) telephone or Ethernet telephone. The data interface 555 can comprise one of Ethernet (10BaseT, 100BaseT, Gigabit) interface, HPNA interface, a universal serial bus (USB) an IEEE1394 interface, an ADSL interface, and other like interfaces.

When the C/M video services terminal 117 generates or when the C/M device 119 such as a cable modem generates RF return signals, these RF return signals are propagated through the modulated RF signal input/output 535 to the diplexer 507. The diplexer 507 passes the upstream analog RF return signals to an analog-to-digital (A/D) converter 509. From the A/D converter 509, the digital RF return signals are passed to a data reducer 511. Further details of the data reducer 511 will be discussed below with respect to FIG. 7a.

The reduced RF return signals are then propagated to a data conditioner 407. The data conditioner 407 at this stage can speed up data transmission of the RF return signals. The data conditioner 407 can comprise a buffer such as a FIFO that also inputs identification information with the digitized RF signals to form RF return packets. That is, an RF return packet can comprise digitized and reduced RF return signals that are coupled with identification and timing information. Reduced RF return signals may enter the data conditioner 407 at an exemplary transmission speed of 40 Megabits per second (Mps) while the newly formed RF return packets exit the data conditioner 407 at an exemplary transmission speed of 500 Megabits per second (Mps). However, other transmission speeds are not beyond the scope of the invention.

RF return packets are transferred upstream from the data conditioner 407 when a switch 513 connects the data conditioner 407 to the digital optical transmitter 530. The switch 513 is controlled by processor 550. When switch 513 is not connected to the data conditioner 407, it can connect the output of the processor 550 to the digital optical transmitter 530. In other words, the switch 513 may be activated at appropriate times to combine the upstream RF return packets from the data conditioner 407 with upstream data packets from the processor 550 destined for the data service hub 110. More specifically, the RF return packets may be inserted between upstream packets comprising data generated by a subscriber with a communication device such as a computer or telephone.

The processor 550 controls the position of switch 513 according to an upstream protocol for the optical network system 100. Exemplary embodiments of programs defining the upstream optical network protocol are discussed in the following copending and commonly assigned non-provisional patent application, the entire contents of which are hereby incorporated by reference: "Method and System for Processing Upstream Packets of an Optical Network," filed on Oct. 26, 2001 in the name of Stephen A. Thomas et al. and assigned U.S. Ser. No. 10/045,584 (Pub. No. 2003/0016692). According to this upstream optical network protocol, a token bucket emulation algorithm can be used.

Figure 6B:
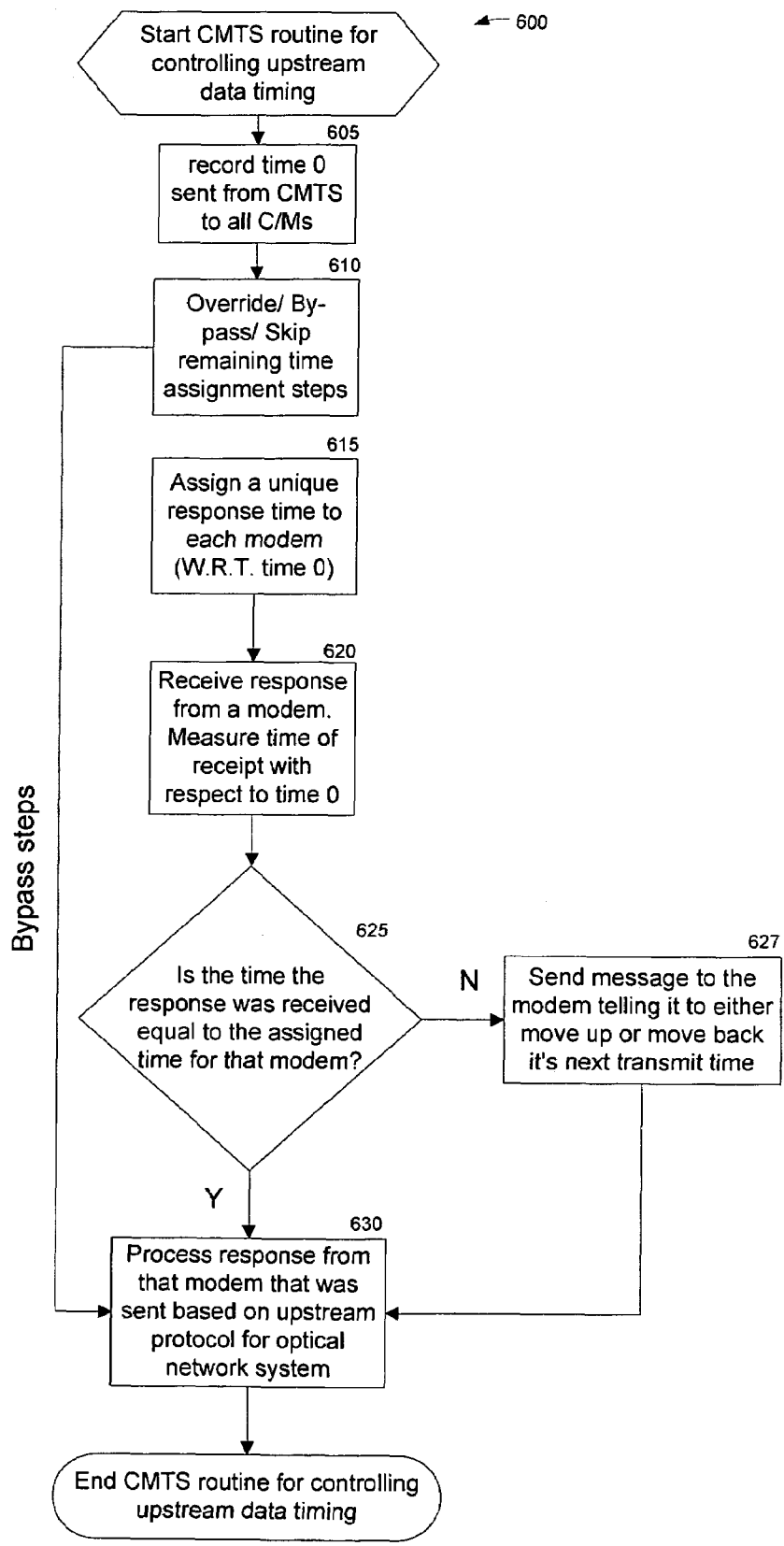
FIG. 6B is a logic flow diagram illustrating an exemplary method for bypassing or overiding a cable modem timing scheme that supports the exemplary embodiments of the invention illustrated in FIGS. 1-6.

Referring now to FIG. 6B, this figure is a logic flow diagram illustrating an exemplary method for bypassing or overiding a cable modem timing scheme that supports the exemplary embodiments of the invention illustrated in FIGS. 1-6. The description of the flow charts in the this detailed description are represented largely in terms of processes and symbolic representations of operations by conventional computer components, including a processing unit (a processor), memory storage devices, connected display devices, and input devices. Furthermore, these processes and operations may utilize conventional discrete hardware components or other computer components in a heterogeneous distributed computing environment, including remote file servers, computer servers, and memory storage devices. Each of these conventional distributed computing components can be accessible by the processor via a communication network.

The processes and operations performed below may include the manipulation of signals by a processor and the maintenance of these signals within data structures resident in one or more memory storage devices. For the purposes of this discussion, a process is generally conceived to be a sequence of computer-executed steps leading to a desired result. These steps usually require physical manipulations of physical quantities. Usually, though not necessarily, these quantities take the form of electrical, magnetic, or optical signals capable of being stored, transferred, combined, compared, or otherwise manipulated. It is convention for one of ordinary skill in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as creating, adding, calculating, comparing, moving, receiving, determining, identifying, populating, loading, executing, etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein.

The invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions. Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Certain steps in the processes or process flow described below must naturally precede others for the invention to function as described. However, the invention is not limited to the order or number of the steps described if such order or sequence does not alter the functionality of the invention. That is, it is recognized that some steps may be dropped entirely or that they may be performed before or after other steps without departing from the scope and spirit of the invention.

Referring back to FIG. 6B, in a conventional cable TV (HFC) network, the amount of round trip delay to any one C/M device 119 is constant (or varies only slowly, over a matter of hours), but is initially unknown. The conventional timing routine of the CMTS 111, that includes steps 605 through steps 630 illustrated in FIG. 6B, is designed to measure the delay and to advance the C/M device's 119 transmit time with respect to the normal start time (as measured at the CMTS 111 in the data service hub 110), to compensate for the round trip delay. In the optical network 100 illustrated in FIG. 1, in which the return path data is put into packets and combined with all other data being sent upstream, the timing will vary from one instance to the next. Hence, the fixed routine of the CMTS 111 for setting the timing does not work. According to a preferred, yet exemplary embodiment of the invention, the timing routine that includes steps 615-625 in the CMTS 111 is skipped, and the upstream protocol of the optical network system 100 is used to make sure that data from two C/M devices 119 or C/M video terminals 117 do not collide. The delay for each C/M device 110 or C/M VST 117 can be different due to different physical distances in the optical network 100.

Referring back to FIG. 6B, step 605 is the first step of the CMTS routine for controlling upstream data timing for C/M devices 119 or C/M VSTs 117 (or both). In this step, the CMTS 111 records the time when a time synchronization signal 1450 is sent to each C/M device 119 or C/M VST 117. This step defines a reference time or reference point from which the CMTS 111 measures the time it receives a response from a respective C/M device 119 or C/M VST 117. Next, step 610 is an override step 610 that is added so that steps 615-625 are not performed by the CMTS 111.

For clarity, steps 615-625 that are skipped according to one preferred exemplary embodiment are described. Step 615 includes the CMTS 111 assigning a unique response time to each C/M device 119 or C/M VST 117 (or both). In step 620, the CMTS 111 and specifically, the routing portion 115 of the CMTS 111, can receive data from a C/M device 119 or C/M VST 117. The CMTS can measure the time of receipt of the data with respect to time zero that it assigned to the particular C/M device 119 or C/M VST 117 in step 615.

In decision step 625, the CMTS 111 can determine if the time of the data that was received by the CMTS 111 in step 620 is equal to the assigned time for that C/M device 119 or VST 117. In other words, if data from a C/M device 119 or C/M VST 117 arrives at a time different than a time that it was assigned by the CMTS 111, then this time is corrected in step 625. If the inquiry to decision step 625 is negative, then the "No" branch can be followed to step 627 in which the CMTS 111 can send a message to the C/M device 119 or C/M VST 117 instructing the device to move up or move back its next transmission time in order to adjust for the delay found in step 620. If the inquiry to decision step 625 is positive, then the "Yes" branch is followed to step 630 in which the response/data from the C/M device 110 or C/M VST 117 is processed.

Thus, step 605 of the CMTS algorithm 600 is performed. If the timing algorithm 600 was not performed, C/M devices 119 or C/M VSTs 117 may believe that they are transmitting properly in their assigned timeslots would overlap at the headend, producing interference.

Steps 625 through 627, which are now skipped, attempt to advance the actual transmission time of any given C/M device 119 or C/M VST 117 so that the transmission will be received at the CMTS 111 at the assigned time, given the delay in the network. Steps 625-627 do not work with packetized systems such as the optical network system 100 because the received transmission time would change on every transmission, causing the CMTS 111 to waste time trying to correct the delay time, when the delay time cannot be corrected due to the nature of the optical network system 111. The invention according to the exemplary embodiment illustrated in FIG. 6 bypasses the timing routine in the CMTS 111, but substitutes the operation of the upstream protocol packetization in the optical network system 100 to prevent collisions between any two communications of respective C/M devices 119 or C/M VSTs 117 (or both).

Referring now to FIG. 7a, this figure illustrates a functional block diagram that describes further details of a data reducer 511 that resides in the subscriber optical interface 140. The RF return signals produced by each C/M video service terminal 117 or C/M device 119 (or both) may comprise signals that bear digital modulation, usually but not necessarily QPSK modulation. These RF return signals are supplied from the C/M video service terminal 117 or C/M device 119 to the RF diplexer 507, which separates the higher-frequency downstream RF signals from the lower-frequency upstream signals. The lower frequency upstream signal typically comprises a single limited-bandwidth RF return signal. It is one object of the present discussion to capture this analog RF signal, convert it to digital form and relay it back to the headend, where it is converted back to an analog RF signal that can be received by a CMTS RF receiver 309.

Data from the low port of RF diplexer 507 is supplied to an RF signal detector 517, which determines when an analog RF signal is present. When a signal appears, RF signal detector 517 notifies a controller 519 of the presence of the signal, and controller 519 can operate a switch 521.

When an RF signal is received and detected by RF signal detector 517, then it is converted to digital form in A/D converter 509. Prior to being converted to digital form, it is sampled in the sample-and-hold function, switch 521 and hold capacitor 523. This sample and hold function is well-known to one of ordinary skill in the art. Switch 521 is closed periodically, resulting in the voltage on the low port of diplexer 507 being transferred to capacitor 523. Then switch 521 is opened, and the voltage remains on capacitor 523 while A/D converter 509 converts the voltage to a digital word. The digital word typically must comprise a minimum number of bits in order to provide an adequate signal-to-noise ratio (S/N) for recovering the data, as is understood by one of ordinary skill in the art.

For recovery of QAM, it is estimated that four bits will yield an adequate S/N. However, this assumes that the signal occupies the entire four bit range. If the signal is too low in amplitude it will not be transmitted at reasonable S/N, and if the signal is of too great an amplitude, it will clip the A/D converter 509 and will fail to supply a useable signal to RF video service control receiver 309. The CMTS 111 using the DOCSIS standard includes the ability to smooth the video service terminal output to the required level or amplitude, but when a C/M video service terminal 117 or C/M device 119 is first added to the system, its level is not correct. Thus, the A/D must have adequate range to digitize the signal even if it is at the incorrect amplitude.

One of ordinary skill in the art knows that the minimum rate at which the signal can be sampled is twice the highest frequency of the signal being sampled. This limitation is known as the Nyquist sampling theorem. This is illustrated in FIG. 7b that presents a graph 526. The sampling frequency, $f_S$, at which switch 521 is cycled, usually must be more than twice the highest frequency in the RF return signal. This highest frequency is represented by $f_H$. Thus, the sampling frequency $f_S$ must be equal to or greater than two times $f_H$.

The data rate needed to support data transmission is given by the product of the sampling frequency $f_S$ and the number of bits transmitted, n. Thus, if 8 bits are needed to transmit an adequate S/N (allowing for errors in signal level), and $f_H$=15

MHz, the minimum data rate is 2×15×8, or 240 Mb/s. In practice, a higher data rate must be used, to compensate for limitations of real filters. Two methods are used to reduce the data rate that must be transmitted. First, the frequency of the signal is reduced, then the number of bits of data is reduced by scaling the amplitude of the digitized signal (data scaling). These methods will be explained below.

After A/D converter 509, the digital signal is propagated to the data conditioner 511. The data conditioner 511 can comprise a down conversion processing unit 527 and a low pass filter 529. Down conversion processing unit 527 comprises a mixing (multiplication) process that takes place in the digital domain. This function may also be implemented in the RF domain before switch 521, as is understood by one of ordinary skill in the art. In the down conversion unit 527, each sample of the digitized signal is multiplied by a number representing a sinusoidal waveform. The number representing a sinusoidal waveform is generated in the digital domain, $f_{LO}$ 531, as illustrated in FIG. 7c, and is the local oscillator signal shown in the spectrum diagram of FIG. 7c.

As is understood by one of ordinary skill in the art, when the RF return signal is mixed with $f_{LO}$ 531, either in the digital domain shown or in the RF domain, several components are generated. These include the difference signal 533, the sum signal 534, and a number of harmonics 536. All of these components with the exception of the difference 533, are removed by low pass filter 529, whose shape is shown by the dashed line 537. As is understood by one of ordinary skill in the art, it is sometimes possible to set $f_{LO}$ equal to the carrier frequency of the incoming signal (usually equal to $(f_H-f_L)/2$). This can result in the lowest possible data rate.

Since the frequency of the sampled signal is now lower, being the difference frequency 533, the number of times the signal is sampled may be reduced without violating the Nyquist sampling theorem. This operation is performed in sample elimination unit 538, which removes unnecessary samples. In a simple case, this function may be performed by simply dropping every other sample point, or by dropping two of three sampling points, etc. In a more sophisticated sample reduction algorithm, the sampling rate may be reduced by choosing sampling times and interpolating between samples of the incoming signal. This technique is understood by one of ordinary skill in the art.

The data scaling unit 539 removes unnecessary numbers of bits from each sample, while maintaining the maximum scaling of the data. The technique is familiar to one of ordinary skill in the art, and for example has been used in the British NICAM (Near Instantaneous Compression and Modulation) method of transmitting digital audio information on an analog channel.

Referring now to FIG. 8, this figure illustrates a functional block diagram that describes further details of a data-to-RF converter 307. When the RF packets containing the C/M upstream transmission are returned to the data-to-RF converter 307 at the data service hub 110, they usually must be restored to their original form. In the scaling restoration unit 317, the data scaling of the RF analog signals represented in the RF packet is restored, reversing the actions performed by the data scaling unit 539 of the data reducer 511 of FIG. 7a.

In the sampling restoration unit 319, the sampling is restored to the original sampling rate by adding samples between the transmitted samples. Interpolating between transmitted samples is understood by one of ordinary skill in the art. The frequency of the signal is up-converted to the original frequency in the frequency up converter 321, by mixing it with a local oscillator signal as shown above. Next the signal is filtered by bandpass filter 323. The signal is then converted to analog form in D/A converter 324. Thus, at the output of D/A converter 324 is the data from the Low port of the RF diplexer 507 of the subscriber optical interface 140, which was supplied to the input of the sample and hold circuit 521 and 523 of FIG. 7a.

FIG. 9 illustrates one exemplary data scaling algorithm 1000 that can be performed by data scaling unit 539. FIG. 9 uses an example of reducing an 8 bit sample down to 4 bits, though other reductions can be used and are not beyond the scope of the invention. The algorithm starts at step 1005. A counter, called an MSB (most significant bit) counter is used in the routine to keep track of the number of places on the left of a data word have been eliminated, as will be evident from the description below. The MSB counter is initially set to a count of 0 in step 1010.

In step 1015, a block of data, such as, but not limited to, thirty-two 8-bit bytes, are read and processed. Within that block of data, each sample is examined in step 1020 to determine if the MSB is a 1 or a 0. If all samples in the block have a 0 in the MSB position, then the inquiry to decision step 1020 is answered "No", meaning that the MSB is not used in any data in that set of bytes. If the inquiry to decision step 1020 is negative, then the "No" branch is followed to step 1025 in which the data may be shifted left. At the same time, the MSB counter referred to above is incremented by 1, to keep track of how many times the block has been shifted. Operation then returns to decision step 1020, which again decides whether the MSB is used. If not, then the process repeats through step 1020, until the MSB is used. Note that this process applies to all the data words in the block of data being processed.

When the MSB is used, then the inquiry to decision step 1020 is positive and the "Yes" branch is followed to step 1030 in which all bits of the word are dropped except for the four most significant bits. Thus, the routine 1000 has caused the retention of the four most significant bits that have data, in the block of data. These bits are transmitted in step 1035 along with the state of the MSB counter, which is used to reconstruct the waveform at the data service hub 110.

FIG. 10 illustrates the scaling restoration process. The restoration process starts at step 1105. The value of the MSB counter is read in step 1110, then data is read in 1115. For each data word, the data is shifted right by the MSB counter value in step 1120, with leading zeros being added to the left of the transmitted bits. Thus, the value that was originally developed in the sample elimination unit 538, is restored. Of course, if fewer than the four most significant bits in the original word have been dropped, then some least significant bits are converted to zero by the process, but they represent only small errors in the recovered signal, and are tolerable.

In decision step 1125, it is determined whether all of the data the current transmission or block has been read. If the inquiry to decision step 1125 is negative, then the "No" branch is followed back to step 1115. If the inquiry to decision step 1125 is positive, then the "Yes" branch is followed to step 1130 where the data scaling restoration process ends.

Figure 11:
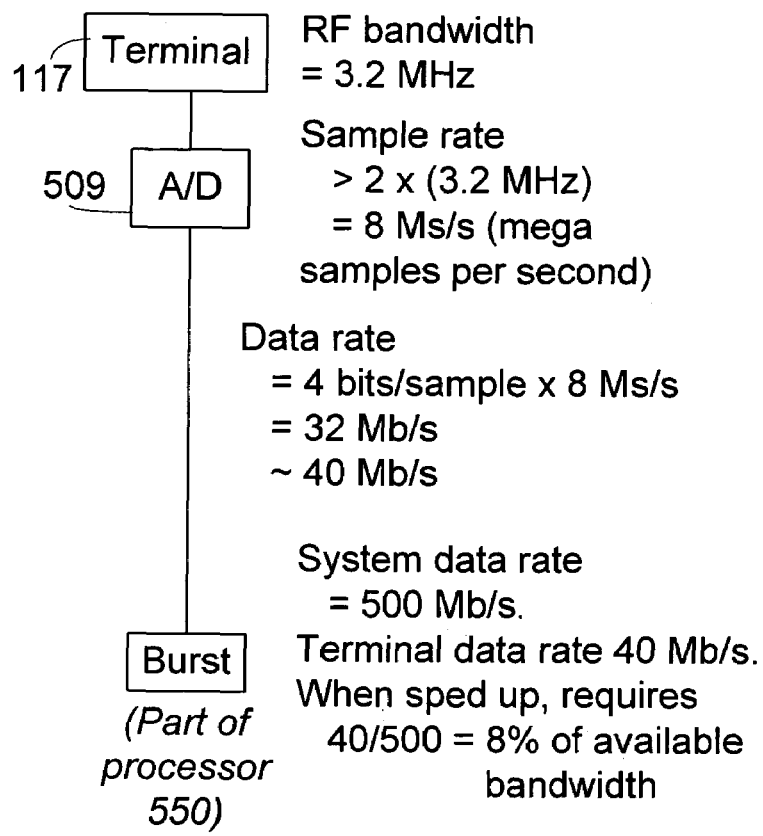
FIG. 11 illustrates an exemplary computation of a burst process according to one exemplary embodiment of the invention.
Figure 12:
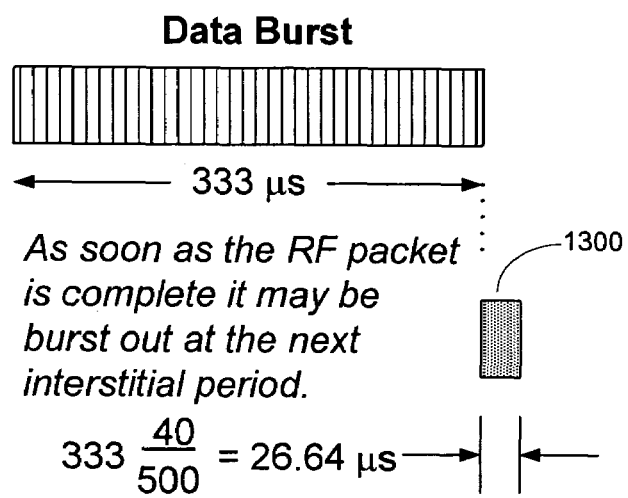
FIG. 12 illustrates an exemplary length of a data burst according to one exemplary embodiment of the invention.

Referring now to FIGS. 11 and 12, these figures illustrate the computation of the burst process for upstream RF return packets of an exemplary embodiment. In this exemplary embodiment, each C/M video service terminal 117 is bursting data in packets that are 333 microseconds long. The occupied bandwidth is an exemplary 3.2 MHz, based on the worst-case C/M return bandwidth. However, other bandwidths may be used in the calculation without departing from the spirit and scope of the invention.

It is usually required that sampling occurs at least twice this rate, or 6.4 Ms/s (mega, or million, samples per second). Sampling at a greater amount, such as at 8 Ms/s, may provide some safety margin and to make frequency selection somewhat easier. If sampling occurs at four bits per sample (16 levels—adequate for QPSK and possibly for 16 QAM modulation with careful level control), this yields a data rate of 32 Mb/s as shown. Some overhead may be needed, so the data rate can be rounded up to 40 Mb/s as the required data rate.

An exemplary burst length is 333 microseconds of data transmitted from a C/M device 119 or C/M VST 117. In an exemplary embodiment, the data transmission on an optical waveguide is 500 Mb/s, so if a 40 Mb/s signal transmission speed is increased to a transmission speed of 500 Mb/s, it will require 40/500=8% of the available bandwidth. Therefore, a 333 microseconds length burst will require a transmission time of 333*40/500=26.64 microseconds.

Because of the detailed requirements of the data transmission method used, this RF return packet usually must be returned to the data service hub 110 and converted back to analog RF with a delay not to exceed just over 2 milliseconds (ms), and with very low jitter. However, other magnitudes of delay, smaller or larger, are not beyond the scope of the invention.

If the bursts were simply packetized and sent back to the data service hub 110, there would be many milliseconds of jitter introduced by the packetized Ethernet transmission system. Thus, the invention teaches a method of getting the bursts of data back to the data service hub 110 outside of the normal method of handling packets, but without unduly burdening the cost of the equipment. The shaded box 1300 in FIG. 12 represents a burst comprising the RF return packet data.

Figure 13:
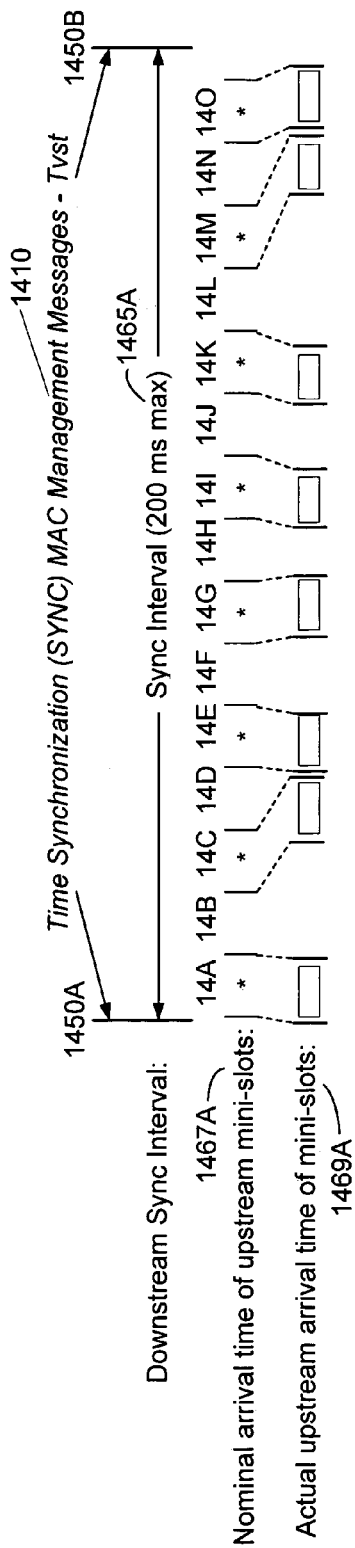
FIG. 13 is a diagram illustrating min-slots in a C/M timing scheme in which alternate slots are used according to one exemplary embodiment of the invention.

Referring now to FIG. 13, this figure illustrates how timing may be modified in the CMTS 111 in the data service hub 110 to work with a Fiber-to-the-Home system or any packet based communications network according to one exemplary embodiment of the invention. As explained in the DOCSIS specifications (section 6.5, ANSI 22-1 2002, Data-Over-Cable Service Interface Specification—DOCSIS 1.0 Radio Frequency Interface), the downstream sync interval or width 1410 of a video service terminal time slot $t_{VST}$, which determines the upstream transmission times from each CABLE MODEM (C/M) video service terminal 117 or CABLE MODEM (C/M) device 119, may be chosen by the operator of the CMTS system 111. But the downstream sync interval usually must not exceed a time of 200 milliseconds for the C/M protocol.

The upstream data from different C/M video service terminals 117 or C/M devices 119 is sent in mini-slots 14, the length of which can also be chosen by the operator. Each mini-slot represents a time interval in which a respective C/M device 119 or C/M VST 117 may transmit upstream data. For example, in FIG. 13, timeslot 14A may represent a first time interval in which a first C/M device 119 (not illustrated) may transmit data while timeslot 14C may represent a third time interval in which a third C/M device 119 (not illustrated) may transmit data. The length of each mini-slot 14 during a given sync interval must be the same, and the allowable times are $2^N$ times 6.25 microseconds, where N is an integer.

Figure 14:
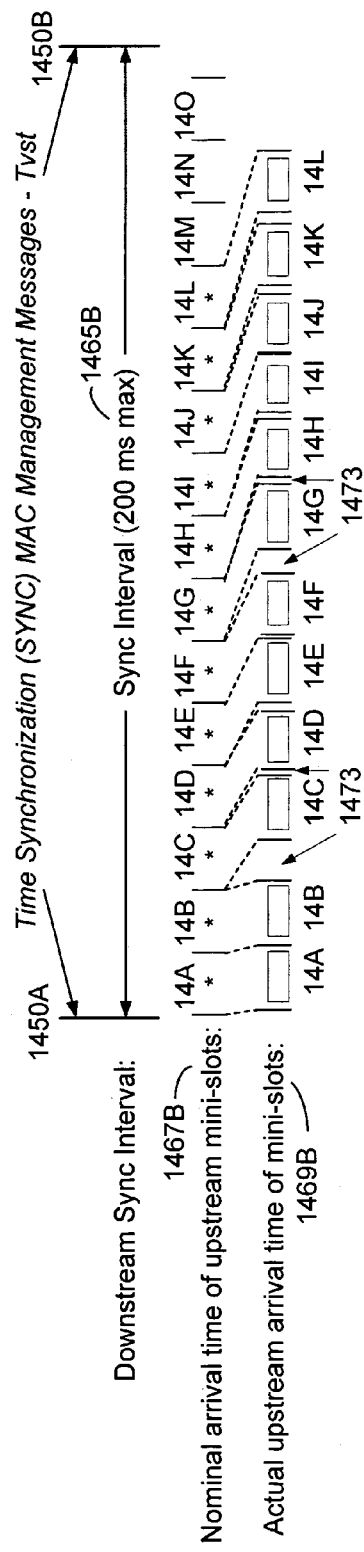
FIG. 14 illustrates an alternate exemplary embodiment of the invention relative to FIG. 14 in which several min-slots in the timing scheme are used in a sequence or one after the other according to one exemplary embodiment of the invention.

As illustrated in FIG. 14, fifteen mini-slots 14A-14O have been selected, each with a length of $2^{11}$ times 6.25 microseconds, or 12.8 milliseconds. The mini-slots are labeled 14A through 14O. In normal operation of a C/M system, the transmission time for each C/M video service terminal 117 or C/M device 119 is offset from the start of the downstream sync interval by a specific time, derived by measuring the round-trip delay time of data sent from the data service hub 110 to each modem at the home, which in the instant case can be a video services terminal 117 that uses C/M for communication.

However, in the FTTH system, or any other packet-based system, the round trip time will comprise at least two different variables:

(I) The propagation time required for the optical signal that carries data, (II) The packetization time due to the need to assemble the return data into a packet which is then transmitted periodically to the Data Service Hub 110. In addition, the packet containing the return data must contend with other packets for the transmission channel, and in the process of contending for the channel, may have to wait for other packets to clear before it can be sent.

The first variable (I) is understood by one of ordinary skill in the art, to be about 100 microseconds of delay for every 10 km of one-way distance over the fiber, and is due to the velocity of propagation in the fiber. This is the variable that the CMTS 111 normally seeks to calibrate out by measuring the delay and telling each modem to advance its transmission time to compensate. The second variable (II) is unique to packet-based systems, and is not handled in the C/M specifications. It is this variable that is addressed with the invention that is described in this document. Video service terminals 117 will only need to transmit data to the CMTS occasionally, but when it does need to transmit, it will need to transmit rather quickly.

Referring briefly back to FIG. 1, C/M video services terminals 117 and C/M devices 119 are illustrated as the endpoints which communicate to the data service hub 110. It is to be understood that the video services terminals 117 and C/M devices 119 use the C/M protocol to communicate with the data service hub 110, as opposed to either ANSI/SCTE 55-1 (formerly known as DVS 178) or ANSI/SCTE 55-2 (formerly known as DVS 167), which were the subject of earlier patent applications filed by the Applicants. It is also to be understood that any device with a DOCSIS-compatible modem could be the endpoint, including a stand-alone cable modem, or any other device with an embedded C/M modem. It is to be understood that the instant teaching also applies to the form of DOCSIS used in Europe and elsewhere, known as EuroDOCSIS, and to other similar systems.

In order for the inventive timing scheme illustrated in FIG. 13 to properly function, temporary data storage usually must be present in the network. These temporary data storage facilities are a natural part of any packet switching or routing function, as is understood by one of ordinary skill in the art. The data service hub can store data temporarily at the laser transceiver node routing device 355. Storage is provided at the laser transceiver node 120 in the optical tap routing device 435. Processor 550 at the subscriber optical interface 140 can also provide temporary storage. The Laser Transceiver Node Routing Device 355 and the Internet Router 340 present in the data service hub 110 can also provide temporary storage. This temporary storage is understood by one of ordinary skill in the art.

Because of the temporary storage in the network, two or more C/M devices 119 such as modems can use the storage. It is not possible to control the advance in timing in a packet network such as a FTTH network, because the packetization delay discussed above (the second variable mentioned above in connection with FIG. 14) will be different every time the modem transmits. Rather, transmissions from two C/M devices 119 may overlap, in which case the network temporary storage identified in the various devices above allows both transmissions to reach the CMTS 111, one after the other. Because of the temporary storage, some transmissions will be delayed by a greater or lesser time before reaching the CMTS 111.

Referring again to FIG. 14, because of the delays caused by packetization and temporary storage in the optical network 100, not all RF return mini-slots can be used. By way of example but not limitation, FIG. 14 shows every other mini-slot 14 being used (Slots 14A, 14C, 14E, and so on), and alternate mini-slots not being used (14B, 14D, 14F, and so on). The asterisks in row 1467A illustrate and denote a nominal time of arrival of a transmission in each mini-slot 14, as the CMTS would normally schedule mini-slots. In the bottom row 1469A, an example is illustrated in which some mini-slot packets from the cable modems arrive slightly early, and some where the packet arrives very late. For example, in the case of mini-slot 14M, it arrives after the expected time of (unused) mini-slot 14N.

Thus in the exemplary embodiment of the invention illustrated in FIG. 14, the normal C/M practice of adjusting the time offset at which each VST 117 or C/M device 119 transmits can be eliminated. Few or no benefits would occur by adjusting the arrival time to compensate for propagation delay. Also, some mini-slots 14 may not be used in order to ensure that all data arrives at the CMTS before the end of the present Downstream Sync Interval 1465A. In the example, every other mini-slot 14 of the downstream sync interval 1465A is not used. Other algorithms could be used. For example, it is possible to not use the last two mini-slots (14N and 14O) during the downstream sync interval 1465A. This time can then be used to "catch up" on data that is late in arriving at the CMTS 111. This catching up on data will be further described below.

Because not every mini-slot 14 is used in most exemplary embodiments of the invention, the upstream communications efficiency is not as efficient as with a normal C/M system. This usually is not a problem, because in an FTTH system, the majority of the data applications are handled on the data tier which typically has more capacity than even a large number of C/Ms used together. Thus, the only data transmitted in the C/M path is that from a Video Services Terminal 117 or some C/M device 119 that makes use of a C/M. The applications that use this RF return tend to be video-on-demand (VOD) ordering information and the like, which typically uses only a small amount of bandwidth, and that can tolerate a few hundred milliseconds delay if needed.

Referring now to FIG. 14, this Figure illustrates an alternate embodiment of FIG. 13. In FIG. 14, alternate timeslots 14 were used such that it was feasible to use eight of the available fifteen mini-slots 14A-14O. In FIG. 14, every mini-slot 14A-14O is used up to a point. In this exemplary embodiment, there usually must be enough time allowed at the end of the downstream sync interval 1465B for any messages that were delayed in the network to "catch up" before the next downstream sync interval 1465B begins. The data burst occurring in mini-slot 14A in this exemplary embodiment is transmitted to the CMTS 111 with relatively little delay. The data burst in mini-slot 14B also is transmitted promptly, because there is no other traffic on the network during that instant of time.

However, the data burst in mini-slot 14C has the lack of fortune to occur when there is some congestion on the network, so it is delayed significantly. See how this delay of the third mini-slot 14C pushes all other mini-slots later in time. Also shown are a number of smaller and larger gaps 1473 between mini-slots occurring as observed at the data service hub 110. The result is that each mini-slot 14 is delayed as much as, or more than, the mini-slot 14 that occurred before it. Thus, some mini-slots 14 at the end of the frame cannot be used such as in the case of mini-slots 14M-14O: The time for mini-slots 14M-14O must be used to allow delayed transmissions to "catch up" before the end of the Sync Interval 1465B.

As is understood by one of ordinary skill in the art, not only is there no guarantee how long it will take a given packet to arrive at the CMTS 111, there is no guarantee that packets will arrive in the order in which the CMTS instructed the various C/M devices 119 to send them. This issue of packets arriving out-of-order can be mitigated by using every other mini-slot 14 as illustrated in FIG. 1, or even in some cases every third or fourth slot 14 could be used. Out-of-order arrival is not a problem for properly designed CMTSs 111, though, because each packet arriving at the CMTS is required to have a preamble prepended to the data which allows the CMTS 111 to sync on the incoming data clock. The upstream message also includes the identity of the C/M device 119, so the CMTS 111 has the information it needs in order to recover meaningful data from the upstream transmission, even if the transmissions arrive significantly displaced in time and in the wrong order.

Figure 15:
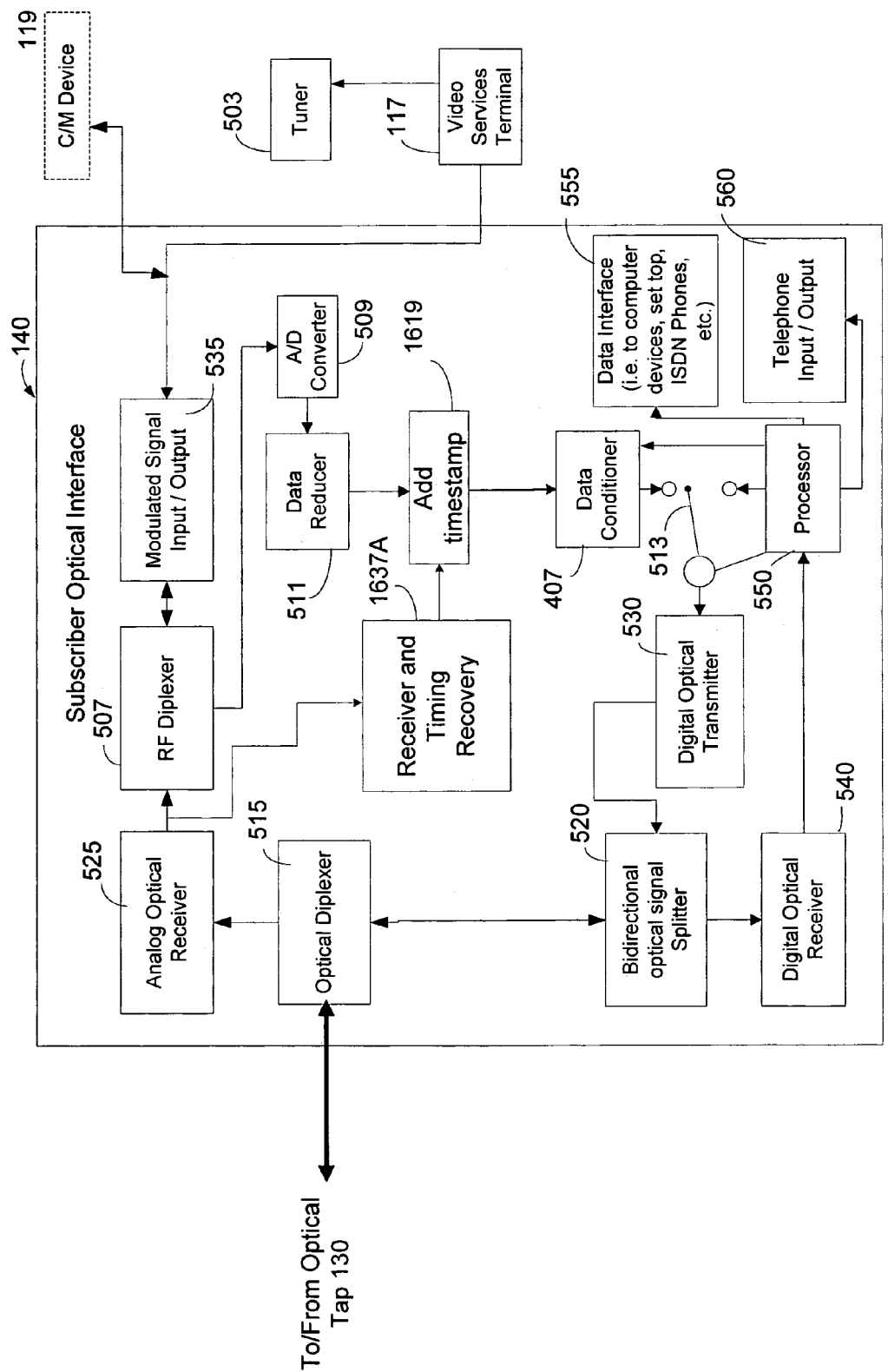
FIG. 15 illustrates a fixed delay that is added in the optical network by time stamping the packets in the subscriber optical interface that bear the upstream RF information according to one exemplary embodiment of the invention.

Referring now to FIG. 15, this figure illustrates an alternate embodiment that can be used with a CMTS 111 that is configured to require packet arrival at prescribed times and in the correct order. The CMTS 111 must accept a longer time delay than that in the DOCSIS specifications, but need not accept packets that arrive at times other than as prescribed by the CMTS 111 (with extra delay to accommodate the packet network).

The extra delay is added in the network 100 by time stamping the packets in the subscriber optical interface 140 that bear the upstream RF information according to one exemplary embodiment of the invention. The time stamp usually must be based on a time marker that is universal in the CTMS system 111, and which is not itself delayed by an indeterminate amount by the optical network 100. Therefore, the CMTS 111 is modified such that it will tolerate a longer delay than that required by current C/M specifications.

A suitable time marker is the time synchronous MAC Management messages 1450A and 1450B as illustrated in FIGS. 13 and 14. These messages 1450A and 1450B are generated by the CMTS 111, and are distributed over the entire network from the data service hub 110 on the RF side of the optical network instead of the data side of the optical network. Since they are distributed on the RF side of the optical network, the RF side denoted above the dashed line as video services in FIG. 3, the time messages are not subject to the same jitter they would encounter if they were distributed on the data side (below the dashed line of FIG. 3 referred to as data services) of the optical network 100. As an alternative to using the MAC management messages of the CMTS, it is possible to provide for time stamping by using a timing generator, as will be illustrated in FIG. 17 and discussed below. The timing generator can either run from it's own time base, or it can receive the MAC management messages from the CMTS and use them to determine timing.

The timing generator can produce data such as a simple time tick, for example, at every 0.1 second. An exemplary time tick is the transmission of five cycles of a 1 KHz tone, where the time=0 reference is defined as occurring at the third positive-going transition of the signal. This type of time tick is known to one of ordinary skill in the art. For example, the time tick can be similar to that used by NIST on their time standard transmissions by WWV radio.)

FIG. 15 illustrates a modified subscriber optical interface 140B relative to the subscriber optical interface 140A illustrated in FIG. 6A according to one exemplary embodiment of the invention. In FIG. 15, a timestamp is added to the RF return data with time stamping device 1619. Timestamps are well known to one of ordinary skill in the art, and they can be used to make sure that data is presented in an optical network at an appropriate later time. In this case, the timestamp is used to control the time that the data from the C/M video services terminal 117 or C/M device 119 is presented to the CMTS 111 at the data service hub 110. The data is presented at a fixed time delay after the time of the timestamp, the delay being long enough to ensure that the data reaches the data service hub 110 from the subscriber optical interface 140.

The idea of this exemplary embodiment is to timestamp the RF return signal at the subscriber optical interface 140, for example, according to when the RF burst first appears. The timestamp may be derived from the time synchronization MAC management messages 1450A, 1450B of FIGS. 14 and 15. Alternative sources of the timing reference are described below and illustrated in FIG. 16. This timestamp is sent to the data service hub 110 along with the digitized data burst. At the data service hub 110, the data is supplied to a FIFO register which delays the data burst until the time of presentation dictated by the timestamp.

According to one exemplary embodiment, the time required for the data to reach the data service hub 110 is on the order of 16-20 milliseconds. But for an example to be understood more easily, suppose the maximum time required to send the message to the Date Service Hub was one minute. Further suppose that a piece of data that was presented at the subscriber optical interface 140 at a time of 8:01:00 would be stamped with that time, and transported to the data service hub 110. At the data service hub 110, the data would be held until one minute later, at 8:02:00, and then would be transmitted to the CMTS 111. The CMTS 111 would only have to know to expect a delay of one minute in the arrival time of the data. Thus, if the data actually arrived at the data service hub at 8:01:01, it would be held for 59 seconds before being presented to the CMTS 111. On the other hand, if the data arrived at the Data Service Hub at 8:01:59, it would be held for only one second before being presented.

Because the time accuracy of the timestamp is critical, the timestamp must be derived from some piece of data that arrives at the Subscriber optical interface 140 on a regular basis, and with constant time delay. Such a piece of data is the time synchronization MAC Management message 1450A and 1450B as illustrated in FIG. 14. In order to recover these message time sync messages 1450, the subscriber optical interface 140 is provided with a receiver and timing recovery circuit 1637A. This recovery circuit 1637A monitors the downstream C/M signal, which is present at the output of the analog optical receiver 525. Each time the time synchronization MAC Management message 1450 is received, a signal is sent from the receiver and timing recovery circuit 1637A to the time stamping device 1619. The time stamping device 1619 then counts the number of pulses of its clock from that signal, and the resulting count is the timestamp information that is added to the RF return data.

In some cases, it may be desirable to improve the accuracy of the timestamp further by making a correction for the error in the local clock of the time stamping device 1619. Techniques for local clock error correction are known to one of ordinary skill in the art. One exemplary local clock error correction technique is to phase-lock the local clock to the time synchronization MAC management message 1450. Another exemplary way is to measure the error in the local clock of the time stamping device 1619 and apply an error correction factor to the timestamp. For example, suppose that it was known due to the relative frequencies, that exactly 10,000 local clock cycles should occur between receipt of two Time Synchronization MAC Management Messages. But in a particular subscriber optical interface 140, due to error in the clock frequency, 10,050 cycles were counted between receipt of consecutive time synchronization MAC management messages 1450. Now suppose that an RF burst was received at 5,000 counts of the local clock. The timestamp added would be $$5000 \frac{10,000}{10,050} = 4975 \text{ counts.}$$

The technique for calculating this time stamp are know to one of ordinary skill in the art.

To summarize the exemplary embodiment illustrated in FIG. 15, the CMTS operation is modified such that an increase in delay time is tolerated by the CMTS 111. A delay is added in the network 100 suitable for removing any jitter in the incoming data, so that the relative time of data presentation to the CMTS 111 is unchanged. According to one exemplary embodiment, the exemplary fixed delay can range between approximately 16 and 24 milliseconds. However, other fixed delays of greater or lesser magnitude are not beyond the scope of the invention.

The amount of fixed delay can be chosen to slightly exceed the maximum delay time that a packet will encounter as it is routed from the subscriber optical interface 140 to the CMTS 111 located in the data service hub 110. This issue is understood by one of ordinary skill in the art.

Figure 16:
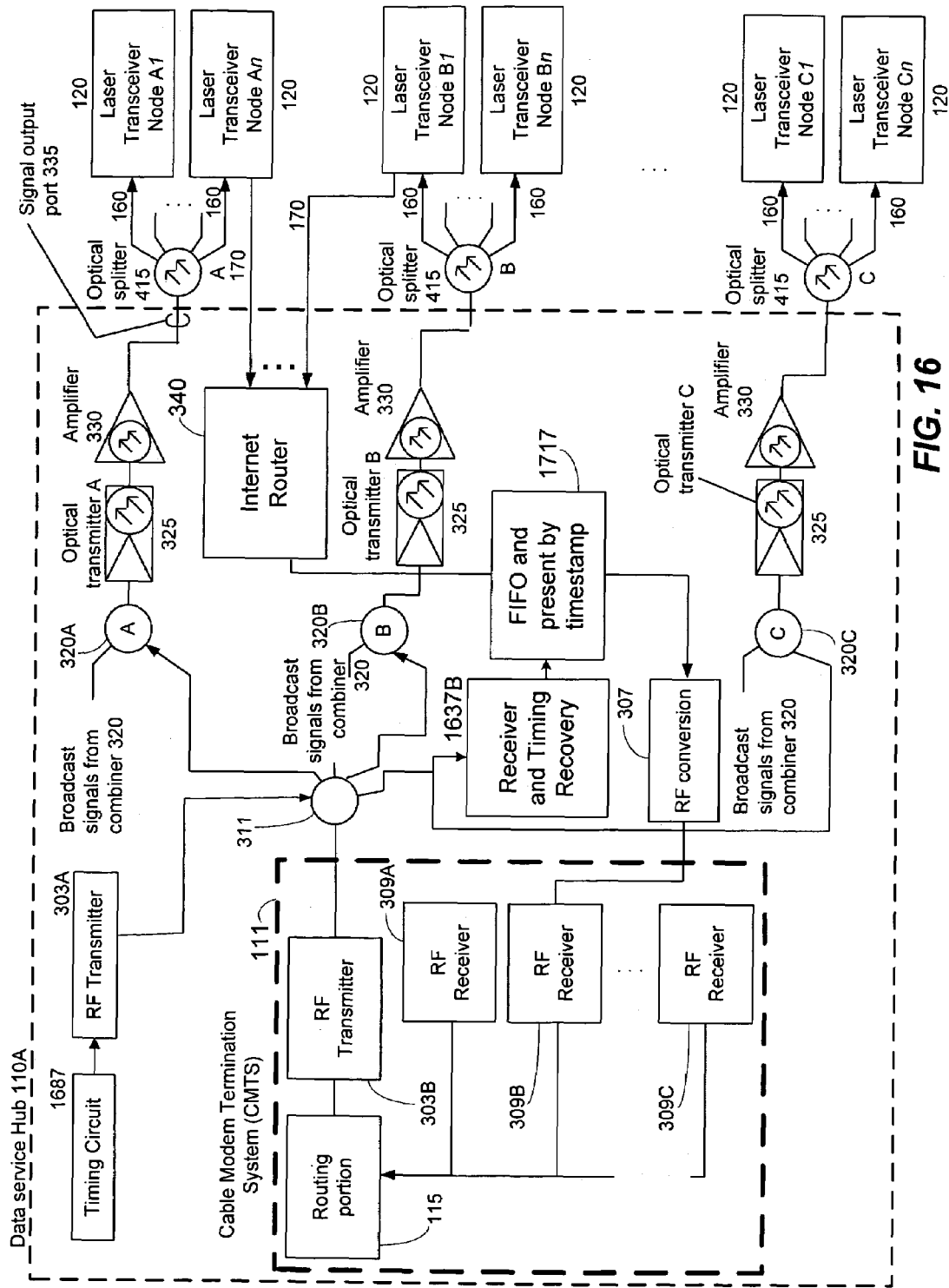
FIG. 16 is functional block diagram that illustrates a modification to the data service hub and that corresponds to the modification made to the subscriber optical interface FIG. 15 according to one exemplary embodiment of the invention.

Referring now to FIG. 16, this figure illustrates a modification to the data service hub 110 that corresponds to the modification made to the subscriber optical interface 140 of FIG. 15 according to one exemplary embodiment of the invention. Certain functional blocks of the data service hub 110 of FIG. 16 have been removed compared to FIG. 3 and FIG. 4 so that the modifications to the data service hub 110 are more readily identifiable. It is understood that the removed features that are fully illustrated in FIG. 3 and FIG. 4 are nonetheless present in the exemplary embodiment of FIG. 17.

Data for the RF return is routed through the data portion of the laser transceiver node and then to a first-in-first-out register (FIFO) 1717. As is understood to one of ordinary skill in the art, a FIFO takes in data when it receives it, and holds it until a time to send it out. In this case, the time to put the data out is derived from the timestamp that was put on at the Subscriber Optical Interface 140. Those skilled in the art know several techniques by which a FIFO register 1717 can be made. It is necessary for the FIFO 1717 to have the same time information present in the subscriber optical interface 140. Accordingly, a C/M Receiver and Sync Recovery circuit 1637B similar to the one in FIG. 15 of the subscriber optical interface 140 is coupled to the FIFO register 1717. The FIFO register 1717 "plays out" the data to the Data-to-RF converter 307 at the time of the timestamp, plus whatever amount has been allowed for transport of signals to the Data Service Hub. An exemplary but not limiting time for transport is 16 milliseconds. Higher or lower values may be appropriate depending on the delay in the network and are not beyond the scope of the invention.

For certain embodiments, a timing generator 1687 is used in conjunction with a timing RF transmitter 303A. The output of the timing transmitter is summed with the output of RF Transmitter 303A from the CMTS Routing portion 115 before being split to go downstream to all subscriber optical interfaces 140, as well as to the timing receiver 1637B in FIG. 17. The timing generator 1687 may operate on it's own time base ("free run"), or it may receive Synchronizing MAC Management messages 1450 from the CMTS 111, and use them to generate a timing reference. The advantage of the embodiment that uses the timing generator 1687 over one that directly recovers the DOCSIS Synchronizing MAC Management message 1450 is that the timing transmitter can be a simple FM transmitter and the timing receiver 1637B can be a simple and inexpensive FM receiver. This can reduce cost at the Subscriber Optical Interface 140.

To summarize the exemplary embodiment of FIG. 16, the CMTS 111 has been modified by adding a fixed delay time to the expected time of receiving a return signal from a C/M VST 117 or terminal 119. The disadvantage of this exemplary embodiment compared to the exemplary embodiments illustrated in FIGS. 14 and 15 above is that additional hardware must be provided in each subscriber optical interface 140. Extra hardware must also be supplied at the data service hub 110, though this is not as significant a problem, as it only has to be supplied once per system, and not once for every subscriber such as the subscriber optical interface 140.

Figure 17:
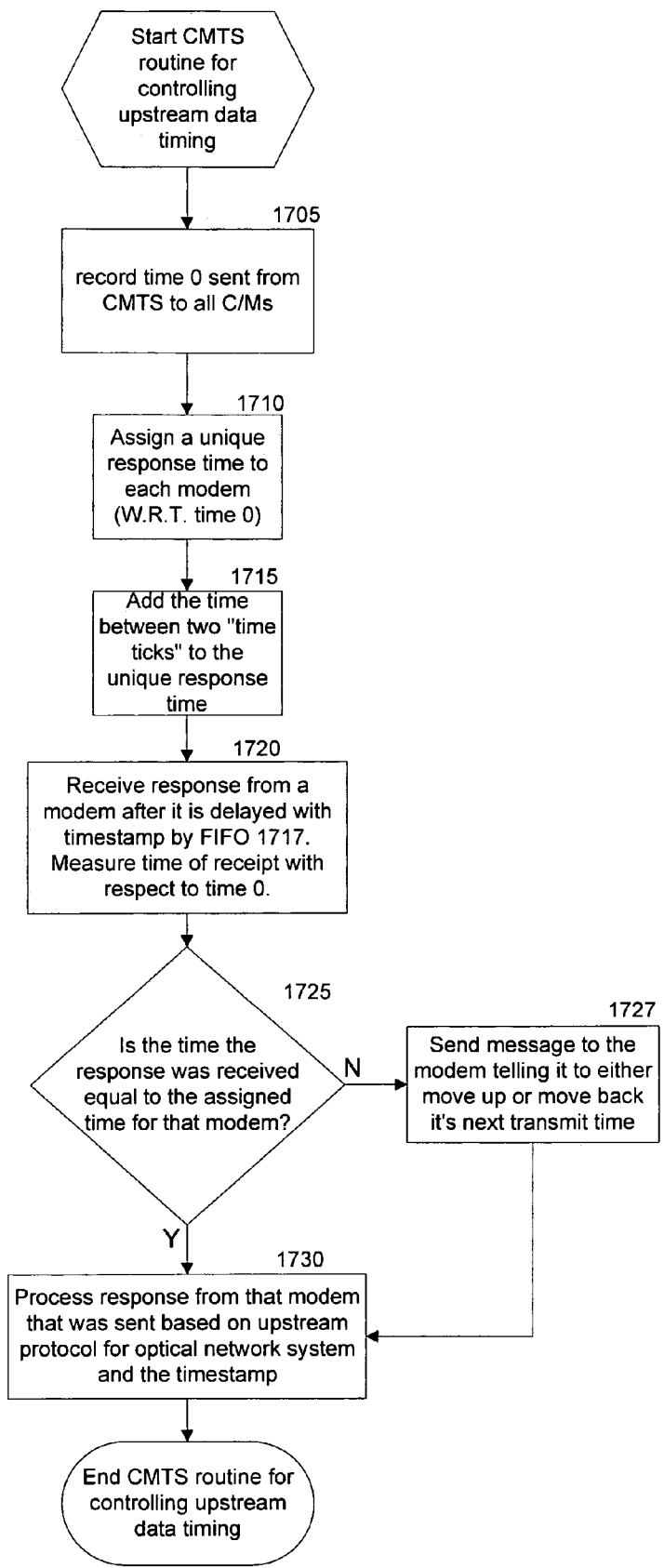
FIG. 17 is a logic flow diagram illustrating an exemplary method for processing upstream packets that have time stamps with the CMTS according to the exemplary embodiment of the invention as illustrated in FIGS. 15-16.

Referring now to FIG. 17, is a logic flow diagram illustrating an exemplary method for processing upstream packets that have time stamps with the CMTS according to the exemplary embodiment of the invention as illustrated in FIGS. 15-16. Step 1705 is the first step of the CMTS routine for controlling upstream data timing for C/M devices 119 or C/M VSTs 117 (or both). In this step, the time when a downstream synchronization signal is sent to a respective C/M device 119 or C/M VST 117 is stored by the CMTS 111.

Next, in Step 1710, the CMTS 111 assigns a unique response time within a particular time synchronization interval 1450 to each C/M device 119 or C/M VST 117 (or both). In step 1715, the CMTS can add the time between two "time ticks" to the unique response time assigned to a particular C/M device 119 or C/M VST 117. This added time will usually compensate for the maximum potential time delay that will be added by the optical network system 100 which packetizes the upstream signals according to an upstream optical network protocol. This added time will not be seen by the C/M devices 119 or C/M VSTs 117, but rather it will only be used by the CMTS 111 to delay the time at which the CMTS 111 expects to receive a signal from an assigned C/M device 119 or C/M VST 117. The length of time allows for the maximum packet transit time in the optical network 100, and will be complemented by the time delay introduced at FIFO 1717.

In step 1720, the CMTS 111 and specifically, the routing portion 115 of the CMTS 111, can process the data from a C/M device 119 or CIM VST 117 after the FIFO 1717 has "played out" the data according to a timestamp. The CMTS 111 can also measure the time of receipt of the data with respect to the modified time zero of Step 1710 that it calculated for a particular C/M device 119 or C/M VST 117.

In decision step 1725, the CMTS 111 can determine if the time of the data that was received by the CMTS 111 in step 1720 is equal to the assigned time for that C/M device 119 or VST 117, including the time added in step 1715. If the inquiry to decision step 1725 is negative, then the "No" branch can be followed to step 1727 in which the CMTS 111 can send a message to the C/M device 119 or C/M VST 117 instructing the device to move up or move back its next transmission time in order to adjust for the delay found in step 1720. If the inquiry to decision step 625 is positive, then the "Yes" branch is followed to step 1730 in which the response/data from the C/M device 110 or C/M VST 117 is processed.

Compared to Steps 610-627 of FIG. 6B, steps 1705-1727 are now executed by the CMTS 111 instead of being skipped as discussed above with respect to FIG. 6B. These cable modem timing steps can be executed because the data from a C/M device 119 or C/M VST 117 is delayed with the timestamps used by the FIFO 1717. The timestamps adjust or compensate for any delays in the optical network 100.

Figure 18A:
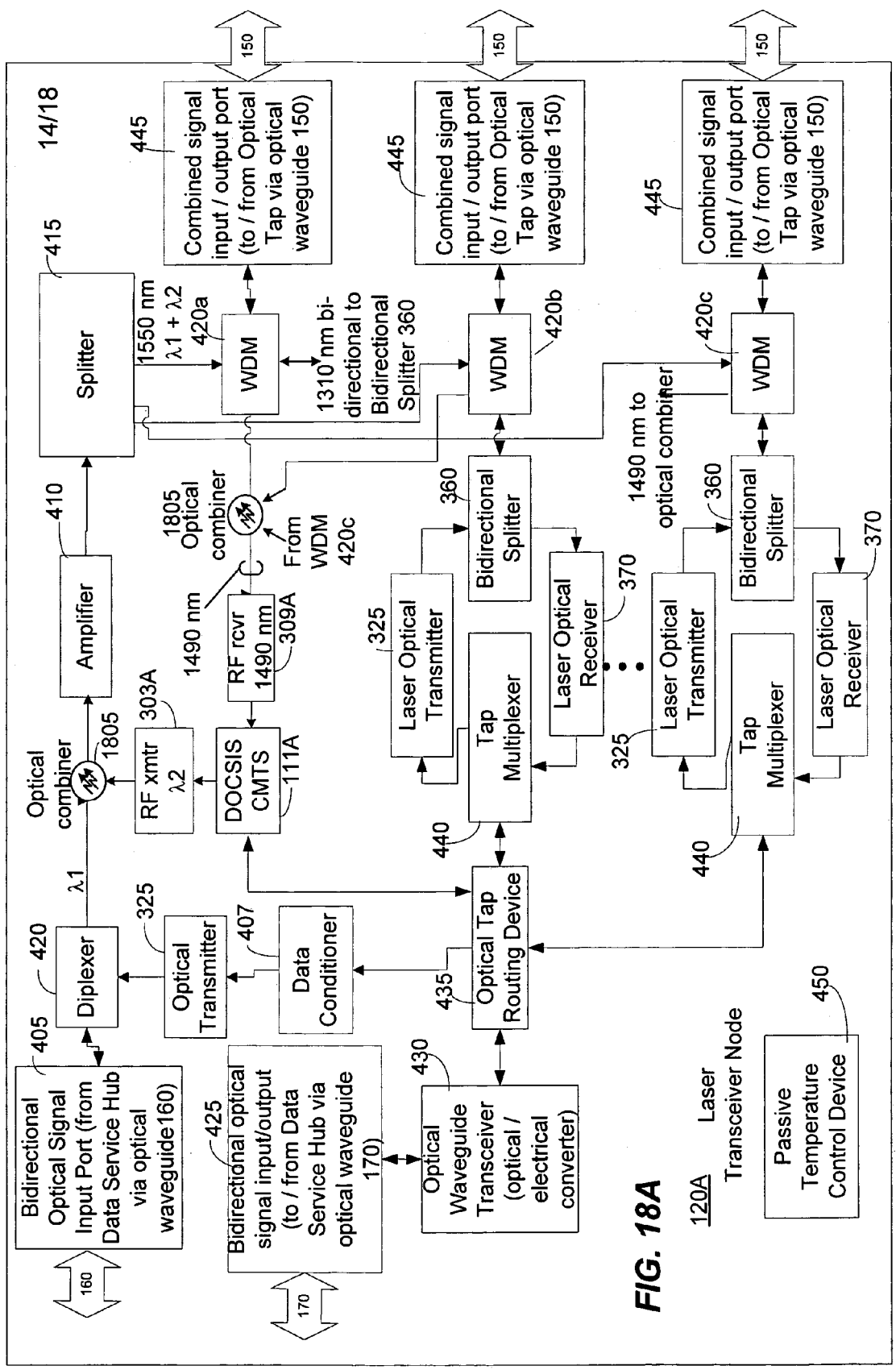
FIG. 18A illustrates a CMTS system located in a laser transceiver node instead of in a data service hub according to one exemplary embodiment of the invention.

Referring now to FIG. 18A, this figure illustrates a CMTS system 111 located in a laser transceiver node 120 instead of in a data service hub 110 according to one exemplary embodiment of the invention. According to this exemplary embodiment, it is assumed that the cost of the CMTS 111 is low enough to be housed in several different laser transceiver nodes 120. The CMTS 111 may be connected to the subscriber optical interface 140 by a separate optical waveguide, or it may be connected using different optical wavelengths, or it may be connected by summing the output of a local optical transmitter with the wavelength already being used at the laser transceiver node 120.

Compare FIG. 18A with FIG. 5. For FIG. 18A, some of the repetitive functional blocks have been removed from the Figure in order to make room to add some new blocks, but the reader is to understand that the removed functional blocks still exist similar to those illustrated in FIG. 5.

A small C/M CMTS 111A has been added in order to support the C/M VSTs 117 or C/M devices 119 served by the laser transceiver node 120A. This laser transceiver node 120A interfaces with the data service hub 110 through a connection to optical tap routing device 435. The CMTS 111A must inject a downstream signal, which it does by way of a RF transmitter 303a. According to this exemplary embodiment, this RF transmitter 303a generates an optical signal in the 1550 nm wavelength region referred to as lambda-2 ($\lambda 2$) which can be different from the downstream optical signals propagating from the waveguide 160 at another wavelength lambda-1 ($\lambda 1$). Wavelength lambda-1 ($\lambda 1$) is usually the wavelength in which downstream video signals are transmitted from the data service hub 110. Lambda-1 ($\lambda 1$) is set by optical transmitter 325 of FIG. 3. As is understood to one of ordinary skill in the art, the two wavelengths, lambda-1 ($\lambda 1$) and lambda-2 ($\lambda 2$), should be in the wavelength band that can be amplified by amplifier 410. These two optical signals are mixed together with the optical combiner 1805. When these two optical signals reach the subscriber optical interface 140, they will effectively be combined.

Comparing the laser transceiver node 120A of FIG. 18A to the laser transceiver node 120 of FIG. 5, the diplexer 420 of FIG. 5 is replaced by a wavelength division multiplexer (WDM) 420 that can separate as well as combine three wavelengths. The two 1550 nm wavelength region signals (lambda-1 ($\lambda 1$) and lambda-2 ($\lambda 2$)) are supplied to WDM 420 by way of optical splitter 415. The upstream and downstream optical signals in the 1310 nm wavelength region are fed into and received from the bidirectional splitter 360. The upstream C/M signals that are usually propagated at a wavelength of 1490 nm are supplied to RF receiver 309a that is part of the C/M CMTS structure. It is understood that the optical wavelengths that have been selected are only exemplary and that other wavelength regions are not beyond the scope of the invention. Further, it is also recognized that the RF transmitter 303a and RF receiver 309a can be physically part of the CMTS 111, but they are shown separately in FIG. 18A in order to explain how they interface to other parts of the optical network 100.

Figure 18B:
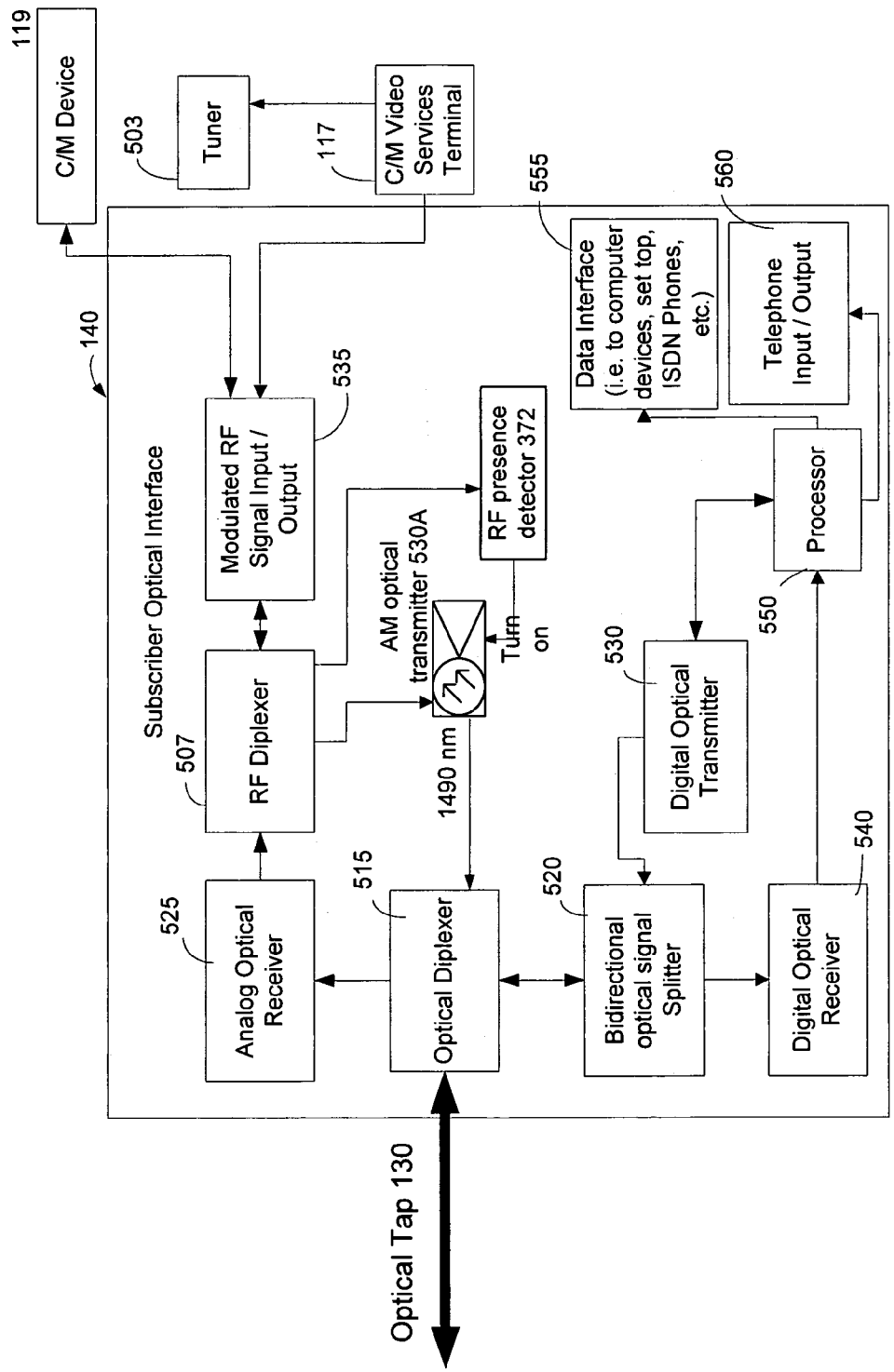
FIG. 18B is a functional block diagram of a subscriber optical interface that is modified to support the operation of the modified laser transceiver node of FIG. 18A according to one exemplary embodiment of the invention.

Referring now to FIG. 18B, this figure illustrates a subscriber optical interface 140A that is modified to support the operation of the modified laser transceiver node 120A of FIG. 18A according to one exemplary embodiment of the invention. FIG. 18B is similar to FIG. 6, however, the A/D converter 509, data reducer 511, and data conditioner 407 have been removed and have been replaced by a small optical transmitter 530A that is added to the subscriber optical interface 140. This small optical transmitter 530A can operate at an exemplary wavelength of 1490 nm. This optical transmitter 530A in the subscriber optical interface 140 is driven by C/M upstream signals from C/M VSTs 117 or C/M devices 119 (or both) in the home via RF diplexer 507. The upstream C/M signals propagated in the 1490 nm wavelength region are referred to as operating in a third wavelength region lambda-3 (λ1) relative to the first downstream video wavelength region lambda-1 (λ1) and second downstream C/M signals wavelength region lambda-2 (λ1) of FIG. 18A. As noted above, it is understood that the optical wavelengths that have been selected are only exemplary and that other wavelength regions are not beyond the scope of the invention.

Figure 19:
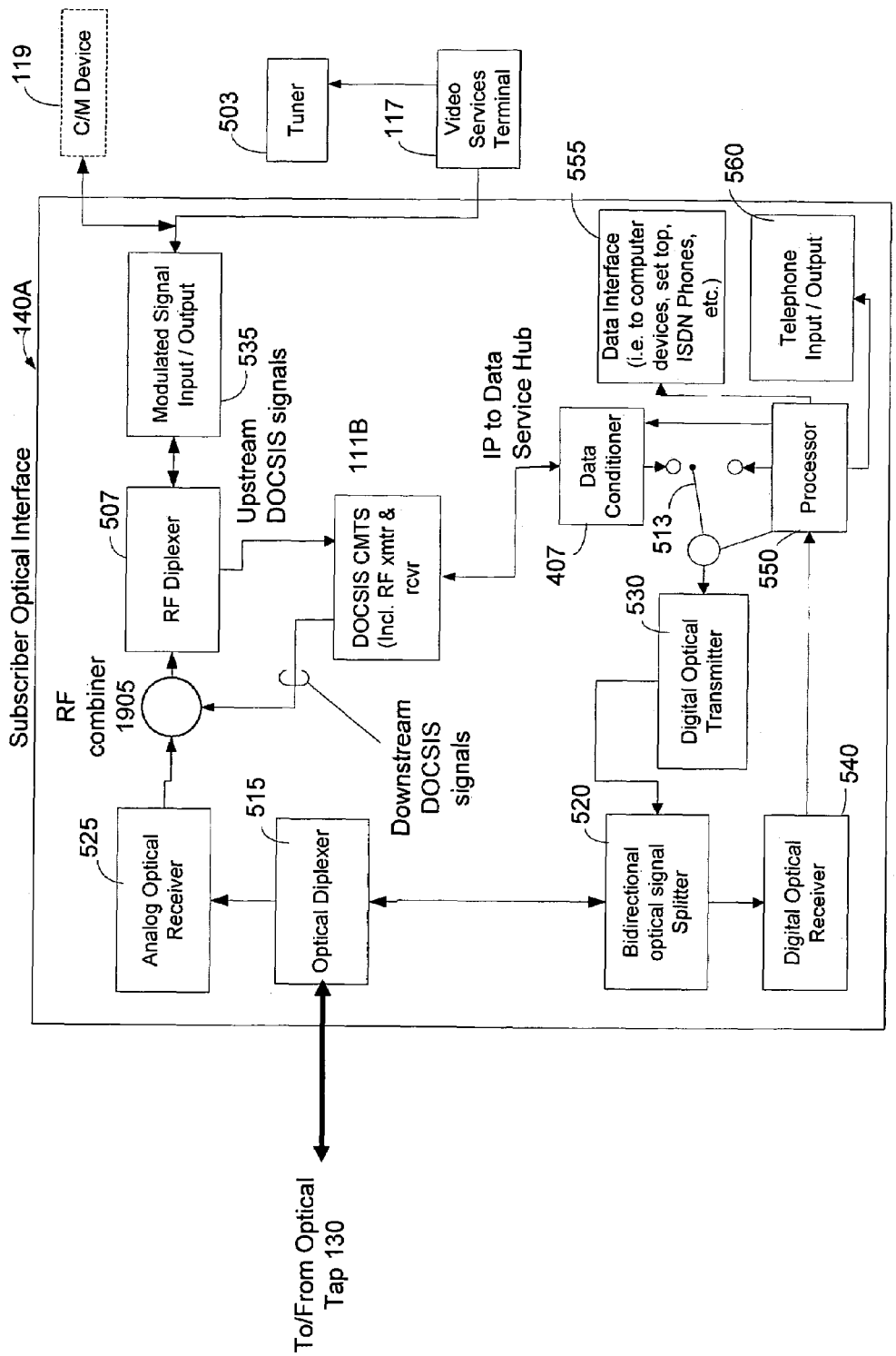
FIG. 19 is a functional block diagram of a subscriber optical interface in which the CMTS may reside according another exemplary embodiment of the invention.

Referring now to FIG. 19, the CMTS 111B may be positioned in the subscriber optical interface 140 according another exemplary embodiment of the invention. In this exemplary embodiment, the CMTS 111B in the subscriber optical interface 140 can manage all modems in a single home (or multiple homes if the subscriber optical interface 140 serves more than one home). In this exemplary embodiment, extra delay for packetization doesn't exist so it is not necessary to modify the operation of the CMTS 111 in any way. However, distances are so short that the ranging function of the CMTS 111 could also be omitted without consequence.

The CMTS 111 can interface in the downstream direction just after Analog Optical Receiver 525, by combining the CMTS downstream signals with the output of the Analog Optical Receiver 525, as is understood by to one of ordinary skill in the art. To accommodate the upstream C/M signals, the upstream receiver of the CMTS 111B can receive signals from the low frequency output of diplexer 507. As noted above, it is recognized that the RF transmitter 303a and RF receiver 309a can be physically part of the CMTS 111 so in this exemplary embodiment, the RF transmitter and RF receiver have been illustrated as part of the CMTS 111B.

The downstream transmitter of the CMTS 111B can inject an electrical RF signals by being combined with the RF output from Analog Optical receiver 525 that is before RF diplexer 507. This mixing of the downstream C/M signals with the downstream RF signals can be done in RF combiner 1905. RF Diplexer 507 separates the upstream RF signal(s) coming from C/M modem(s) in the home, and routes them to the RF receiver in CMTS 111B. The CMTS 111B interfaces, ultimately, with the laser transceiver node routing device 355 via data conditioner 407. The data conditioner 407, depending on the implementation of the CMTS 111B, can be where packets from the CMTS 111 B are placed into internet protocol (IP) packets for routing to and from the laser transceiver node 120.

Figure 20:
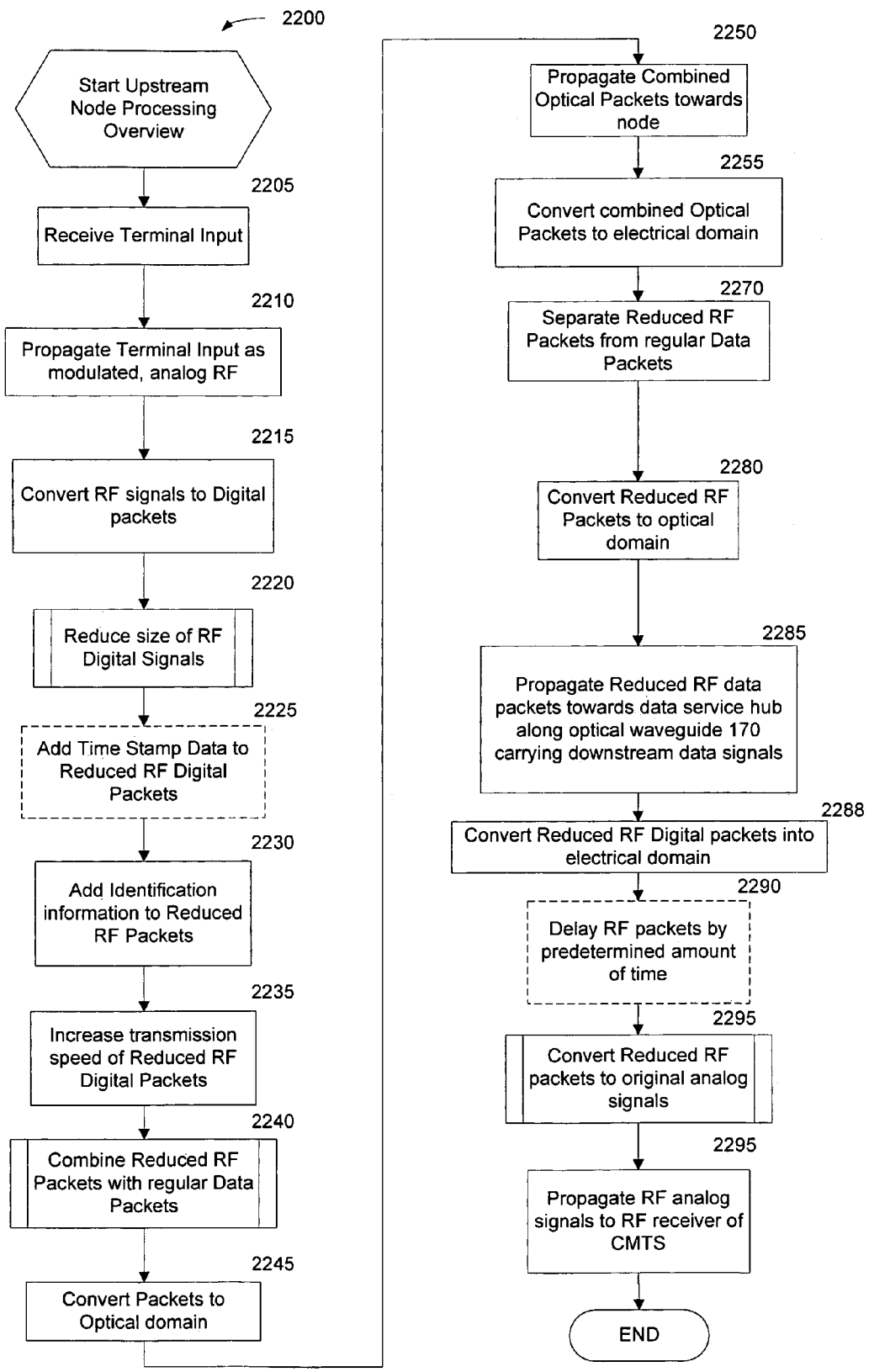
FIG. 20 is a logic flow diagram illustrating an exemplary method for propagating upstream RF return signals towards a data service hub using a C/M protocol according to the exemplary embodiments of FIGS. 14-17.

Referring now to FIG. 20, this figure illustrates an exemplary method for returning C/M RF return signals in an upstream direction for the exemplary embodiments illustrated in FIGS. 14-17. Basically, FIG. 20 provides an overview of the processing performed by the subscriber optical interfaces 140, laser transceiver nodes 120, and data service hub 110. As noted above, certain steps in the process described below must naturally precede others for the invention to function as described. However, the invention is not limited to the order of the steps described if such order or sequence does not alter the functionality of the invention. That is, it is recognized that some steps may be performed before or after other steps without departing from the scope and spirit of the invention.

Step 2205 is the first step in the exemplary upstream overview process 2200. In step 2205, terminal input is received from a C/M video service terminal 117 or C/M device 119. Next, in step 2210, the terminal input is propagated as modulated analog RF signals towards the subscriber optical interface 140.

In step 2215, the analog RF signals are converted to digital packets with the A/D converter 509. However, it is noted that step 2215 does not need to take place in the subscriber optical interface 140. As discussed above, the analog to digital conversion process can take place at the laser transceiver node 120 or it could occur at the C/M video service terminal 117 or C/M device.

Next, in routine 2220, the size of the RF packets generated by the A/D converter 509 are reduced by the data reducer 511. Further details of routine 2220 have been described above with respect to FIG. 8. In step 2225, time-stamped data is added to the reduced RF packets by the time stamp device 1619 for the exemplary embodiment described in connection with FIGS. 15-16. This step 2225 may be skipped for other exemplary embodiments, such as for the embodiments illustrated in FIGS. 1-6 and FIGS. 13 and 14.

In step 2230, identification information is added to the reduced RF packet. This identification information can comprise headers used to uniquely identify RF packets from other types of data packets. Steps 2225 and 2230 can be performed by a data conditioner 407. However, functions identified in steps 2230 and 2235 can be accomplished with other hardware devices other than the data conditioners 407. The invention is not limited to the hardware devices which performs the functions described in steps 2230 and 2235 nor is the invention limited to the order or sequence in which these two steps are performed. In routine 2240, the reduced RF packets are combined with regular data packets. Further details of routine 2240 will be discussed below with respect to FIG. 21.

In step 2245, the electrical packets are converted to the optical domain. Next, in step 2250, the combined optical packets are propagated towards the laser transceiver node 120. In step 2255, the combined optical packets are converted to the electrical domain with a digital optical receiver such as the receiver 370 as illustrated in FIG. 5. In step 2270, the reduced RF packets are separated from the regular data packets in the optical tap routing device 435 of the laser transceiver node 120.

Next, in step 2280, the reduced RF packets are converted back to the optical domain by a low power optical transmitter 325. In step 2285, the reduced RF packets are propagated upstream towards a data service hub 110 along an optical wave guide 170 that also carries down stream data signals. In step 2288, the reduced RF Digital packets are converted back to the electrical domain in low speed data receiver 370.

In step 2290, the RF packets can be delayed by a predetermined amount according to the timestamp by the time stamping device 1619 of FIGS. 15-16. This step 2290 may be skipped for other exemplary embodiments, such as for the embodiments illustrated in FIGS. 1-6 and FIGS. 13 and 14. For the embodiment of FIGS. 15-17, it is in this step 2288 that the FIFO register 1717 "plays out" the data to the Data-to-RF converter 307 at the time of the timestamp, plus whatever amount has been allowed for transport of signals to the data service hub 110.

In routine 2295, the reduced RF packets are converted to the original RF analog signals that were originally produced by the video service terminals 117. Further details of routine 2295 have been described above with respect to FIG. 10. In step 2298, the RF analog signals are propagated to the RF receiver 309 that is coupled to the CMTS 115.

Refer now to FIG. 21, this figure illustrates an exemplary subroutine or subprocess 2240 for combining reduced RF packets with regular data packets as discussed above with respect to FIG. 20. The combining reduced RF packets with regular data packets routine 2240, starts with step 2305. In step 2305, the processor 550 of each subscriber optical interface can determine if any reduced RF packets that comprise cable modem transmissions from a C/M device 119 or C/M VST 117 exist.

Next, in step 2310, the processor 550 will transmit any upstream reduced RF packets that comprise upstream cable modem transmissions if any such reduced RF packets exist. The processor 550 will usually send both upstream regular data packets and cable modem transmissions from the C/M device 119 or C/M VST 117 at time interval lengths and at frequency intervals according to the upstream protocol of the optical network 100. One example of an upstream optical network protocol that can be used is "Method and System for Processing Upstream Packets of an Optical Network," filed on Oct. 26, 2001 in the name of Stephen A. Thomas et al. and assigned U.S. Ser. No 10/045,584 (Pub. No. 2003/0016692), the entire contents of which are hereby incorporated by reference.

While the upstream transmission of data packets can be interrupted at intervals with upstream RF packet transmissions from the C/M devices 119 or C/M VSTs 117, it is noted that the intervals of interruption do not need to be regularly spaced from one another in time. The intervals of interruption will usually be governed by the upstream protocol of the optical network 100.

Step 2310 corresponds to the activation of switches 513 in each subscriber optical interface 140 that is part of a subscriber grouping. The subscriber groupings are usually determined by the number of subscribers that will be serviced by a particular video service receiver 309 that is typically located in the data service hub 110. After step 2310, the subprocess ends and the process returns to step 2245, FIG. 20.

Referring now to FIG. 22, this figure is a logic flow diagram illustrating an overview of an exemplary process for supporting cable modem signals over an optical network by adjusting the cable modem timing scheme according to one exemplary embodiment of the invention. Step 2305 is the first step in the process in which a magnitude of the time synchronization media access control interval is selected. Usually, this magnitude cannot exceed 200 milliseconds according to most cable modem protocols, such as DOCSIS. This step corresponds with FIG. 14 and the magnitude between the time sync messages 1450A and 1450B.

Next, in step 2310, the time interval between messages 1450A and 1450B is divided into equally sized mini-slots 14A-140. The length of each min-slot during a given sync interval must be the same and the allowable magnitudes are $2^N$ time 6.25 microseconds, where N is an integer. However, one of ordinary skill in the art will appreciate that other magnitudes based on future protocols are not beyond the invention.

In step 2315, upstream cable modem signals are transmitted using less than all of the mini-slots for a given synchronization interval. According to one exemplary embodiment, alternate min-slots can be used such as illustrated in FIG. 14. According to another exemplary embodiment, mini-slots in a series or sequence can be used and with one or more mini-slots at the end of the series remain un-used as illustrated in FIG. 15.

Next, in step 2320, the upstream cable modem signals (now in digital packet form and in the electrical domain) can be temporarily stored in one or more portions of the optical network. For example, storage can be provided at the data service hub 110 in the laser transceiver node routing device 355. Other storage can be provided at the laser transceiver node 120 in the optical tap routing device 435. Similarly, processor 550 in the subscriber optical interface 140 can provide storage of the cable modem signals that are in a digital packet format and are in the electrical domain within the optical network 100.

In step 2325, the upstream cable modem signals are processed by the cable modem termination system 111 that is usually placed in the data service hub 110. The upstream cable modem signals can be converted from packets back into an analog format in this step, prior to being processed by the CMTS 111. After step 2325, the process ends.

Referring now to FIG. 23, this figure is a logic flow diagram illustrating an overview of an exemplary process for supporting cable modem signals over an optical network by adding a time stamp to the upstream cable modem signals according to one exemplary embodiment of the invention. Step 2405 is the first step in the process in which upstream cable modem signals are received by a subscriber optical interface 140 as illustrated in FIG. 16. In step 2410, the downstream time synchronization messages 1450A, 1450B are monitored by a cable modem receiver 1637A. As noted above, these time synchronization messages could be the ones produced by the CMTS 111, such as messages 1450A, 1450B illustrated in FIG. 13. Alternatively, these messages can be produced by the timing circuit 1687 in FIG. 16.

Next, in step 2415, a time stamp is added to the upstream cable modem signals based on the time synchronization messages. This step corresponds with the time stamp adding device 1619 of FIG. 16.

In step 2420, the upstream cable modem signals are converted into the optical domain with the subscriber optical interface 140 through the digital optical transmitter 530. Next, in step 2425, the optical signals are sent over the optical network 100 to the data service hub 110 where the CMTS 111 can process the signals.

Referring now to FIG. 24, this figure is a logic flow diagram illustrating an overview of an exemplary process for supporting cable modem signals over an optical network by positioning a cable modem termination system within the optical network before a data service hub according to one exemplary embodiment of the invention. Step 2505 is the first step of the process in which a data service hub 110 is provided. The data service hub 110 can support video services or data services (or both) to subscribers who are on the other end of the optical network 100.

In step 2510, a cable modem termination system 111 can be positioned within an optical network such that it is positioned in a laser transceiver node 120 as illustrated in FIG. 18A. According to another exemplary embodiment of the invention, the CMTS 111 can be positioned in the subscriber optical interface 140 as illustrated in FIG. 1-9.

In step 2515, the CMTS 111 can process the upstream cable modem signals. And in Step 2520, the CMTS 111 that is positioned within the optical network 100 can forward the processed upstream cable modem signals to the data service hub 110. After step 2520, the process ends.

The invention is not limited to providing a return path for just legacy C/M video service terminals 117 or C/M devices 119. The RF return path of the invention can be carry signals of other hardware devices that may not characterized as "legacy" hardware. The invention may simply be used to provide increased bandwidth for additional conventional electronic communication devices that are supported by the optical network.

CONCLUSION

Thus, the invention provides a unique method for inserting RF return packets (derived from RF return signals produced by a C/M video service terminal 117 or C/M device 119) between upstream packets comprising data generated by a subscriber with a digital communication device such as a computer or internet telephone. Thus, the invention provides an RF return path for legacy terminals 117 or cable modem devices 119 that share a return path for regular data packets in an optical network architecture 100. The invention also provides a way in which the upstream transmission timing scheme that is controlled by the cable modem termination system 111 housed within the data service hub is preserved. The invention can operate independently of the legacy upstream transmission timing scheme so that the legacy upstream transmission timing scheme can remain effective. The invention can also adjust the transmission rate of RF packets during certain stages in an optical network in order to take advantage of lower cost hardware.

In another alternative exemplary embodiments, the invention allows for less complex hardware that can be provided in the subscriber optical interface or laser transceiver node or both for subscribers.

It should be understood that the foregoing relates only to illustrate the embodiments of the invention, and that numerous changes may be made therein without departing from the scope and spirit of the invention as defined by the following claims.

What is claimed is:

1. A method for supporting upstream signals propagated according to a cable modem protocol sent over an optical network comprising:
   receiving the upstream signals;
   monitoring a downstream time synchronization produced by the cable modem protocol;
   adding a time stamp to the upstream signals with a time stamp device which is independent of the cable modem protocol and the stamp not being processed by the cable modem protocol but based on the downstream time synchronization, the time stamp compensating for propagation delays caused by digital switching in the optical network;
   converting the upstream signals into the optical domain for propagation through the optical network; and
   sending the upstream optical signals over the optical network to a cable modem termination system operating according to the cable modem protocol.

2. The method of claim 1, wherein monitoring a downstream time synchronization comprises monitoring a media access control management message sent by a cable modem termination system.

3. The method of claim 1, wherein monitoring a downstream time synchronization comprises monitoring a time message produced by a circuit that is independent of a cable modem termination system.

4. The method of claim 1, further comprising holding the upstream signals for a predetermined time period based on the time stamp before sending the upstream signals to the cable modem termination system.

5. The method of claim 1, further comprising converting the upstream signals from an analog format to a digital format.

6. The method of claim 1, further comprising reducing a size of the upstream signals.

7. The method of claim 1, wherein the cable modem protocol comprises a Data Over Cable Service Interface Specification.

8. The method of claim 5, further comprising reducing a size of the upstream signals.

9. The method of claim 8, wherein the cable modem protocol comprises a Data Over Cable Service Interface Specification.

10. A method for supporting upstream signals propagated according to a cable modem protocol sent over an optical network comprising:
    overriding a time synchronization routine of the cable modem protocol by ignoring unique response time intervals assigned to one or more cable modem devices with a cable modem termination system;
    receiving upstream cable modem signals based on an upstream protocol of the optical network that is different from the cable modem protocol; and
    processing the upstream cable modem signals with the cable modem termination system.

11. The method of claim 10, wherein overriding a time synchronization routine of the cable modem protocol further comprises overriding a time synchronization routine of cable modem protocol comprising a Data-Over-Cable Service Interface Specification (DOCSIS).

12. The method of claim 10, further comprising managing upstream data signals originating from devices other than cable modems with the upstream protocol of the optical network.

13. The method of claim 10, further comprising converting upstream electrical cable modem signals into an optical domain.

14. The method of claim 12, further comprising converting optical cable modem signals back into an electrical domain for processing by the cable modem protocol termination system.

15. The method of claim 14, further comprising managing upstream data signals originating from devices other than cable modems with the upstream protocol of the optical network.

\* \* \* \* \*